United States Patent
Matsumura et al.

(10) Patent No.: US 11,943,157 B2
(45) Date of Patent: Mar. 26, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 357 days.

(21) Appl. No.: 17/595,424

(22) PCT Filed: May 14, 2020

(86) PCT No.: PCT/JP2020/019335
§ 371 (c)(1),
(2) Date: Nov. 16, 2021

(87) PCT Pub. No.: WO2020/235456
PCT Pub. Date: Nov. 26, 2020

(65) Prior Publication Data
US 2022/0224470 A1     Jul. 14, 2022

(30) Foreign Application Priority Data
May 17, 2019   (JP) ................... 2019-094118

(51) Int. Cl.
*H04L 5/00*     (2006.01)
*H04W 72/044*   (2023.01)
*H04W 72/20*    (2023.01)

(52) U.S. Cl.
CPC ......... *H04L 5/0048* (2013.01); *H04W 72/046* (2013.01); *H04W 72/20* (2023.01)

(58) Field of Classification Search
CPC ..... H04L 5/0048; H04L 5/001; H04L 5/0051; H04L 5/0057; H04W 72/046;
(Continued)

(56) References Cited

U.S. PATENT DOCUMENTS

2019/0190669 A1   6/2019   Park et al.
2019/0239212 A1*  8/2019   Wang ................... H04L 5/0051
(Continued)

FOREIGN PATENT DOCUMENTS

EP     3471327 A1    4/2019

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
(Continued)

*Primary Examiner* — Hashim S Bhatti
(74) *Attorney, Agent, or Firm* — Osha Bergman Watanabe & Burton LLP

(57) ABSTRACT

A user terminal includes a control unit that determines, based on at least one of comparison of a time offset with a threshold value between a timing related to a spatial relation of uplink transmission and the uplink transmission and that usage of a sounding reference signal (SRS) resource set for the uplink transmission is a specific usage, one of a transmission control indication (TCI) state or a quasi-co-location (QCL) assumption for downlink transmission and indicated spatial relation information as the spatial relation, and a transmitting unit that performs the uplink transmission by using the spatial relation.

7 Claims, 13 Drawing Sheets

(58) Field of Classification Search
CPC ..... H04W 72/20; H04W 16/28; H04W 88/02; H04B 7/0404; H04B 7/0695
See application file for complete search history.

(56) References Cited

U.S. PATENT DOCUMENTS

2019/0297603 A1* 9/2019 Guo ................... H04L 5/0053
2019/0312698 A1* 10/2019 Akkarakaran ........ H04W 52/42

OTHER PUBLICATIONS

3GPP TS 38.214 V15.5.0 "3rd Generation Partnership Project; Technical Specification Group Access Network; NR; Physical layer procedures for data (Release 15)" Mar. 2019 (5 pages).
3GPP TSG RAN WG1 Meeting #97; R1-1907650 "Feature lead summary of Enhancements on Multi-beam Operations" LG Electronics; Reno, USA; May 13-17, 2019 (34 pages).
International Search Report issued in International Application No. PCT/JP2020/019335, dated Jun. 23, 2020 (5 pages).
Written Opinion issued in International Application No. PCT/JP2020/019335; dated Jun. 23, 2020 (4 pages).
Office Action issued in counterpart Japanese Patent Application No. 2021-520753 dated May 30, 2023 (6 pages).

* cited by examiner

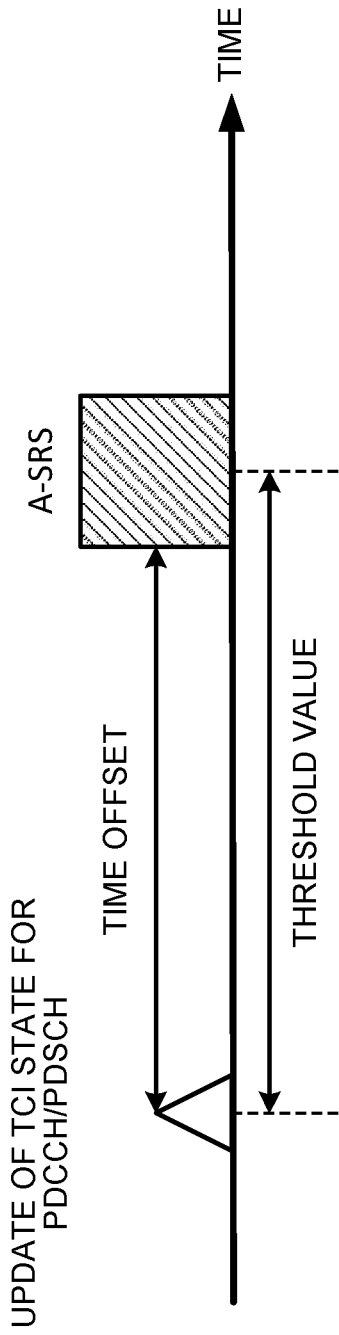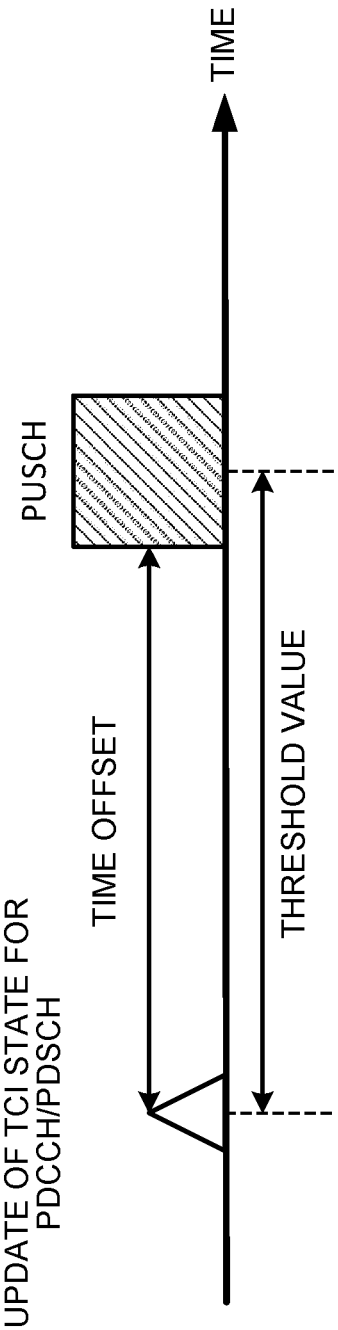

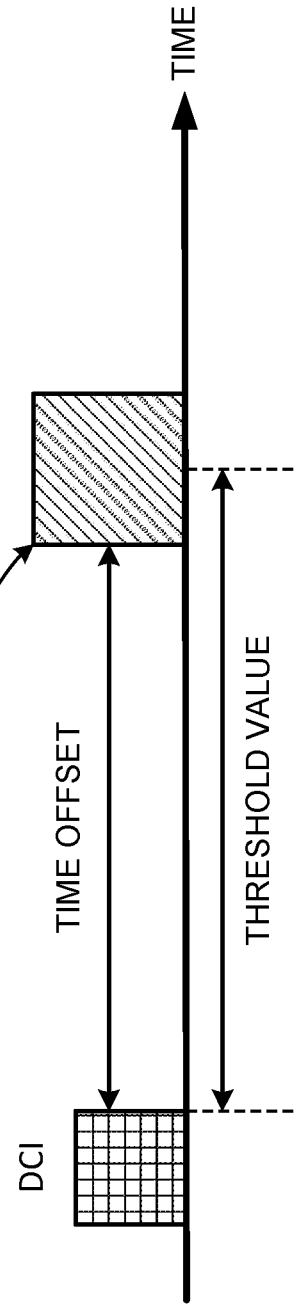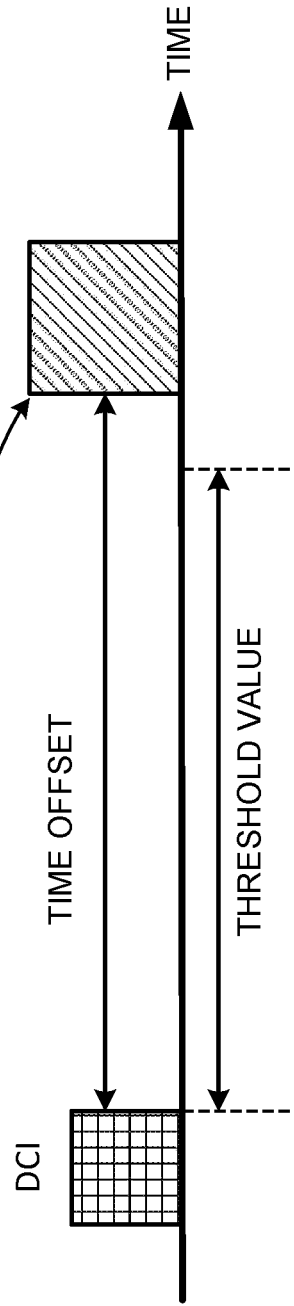

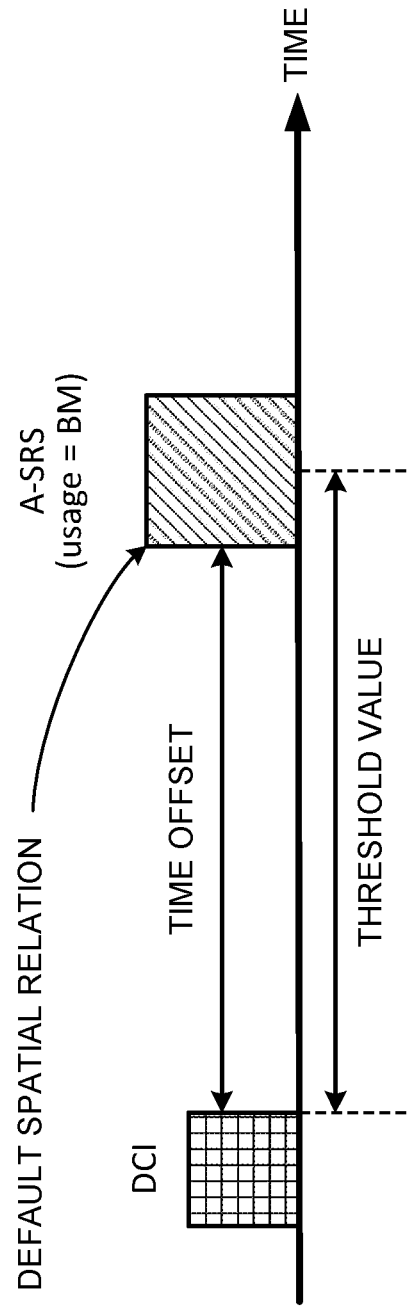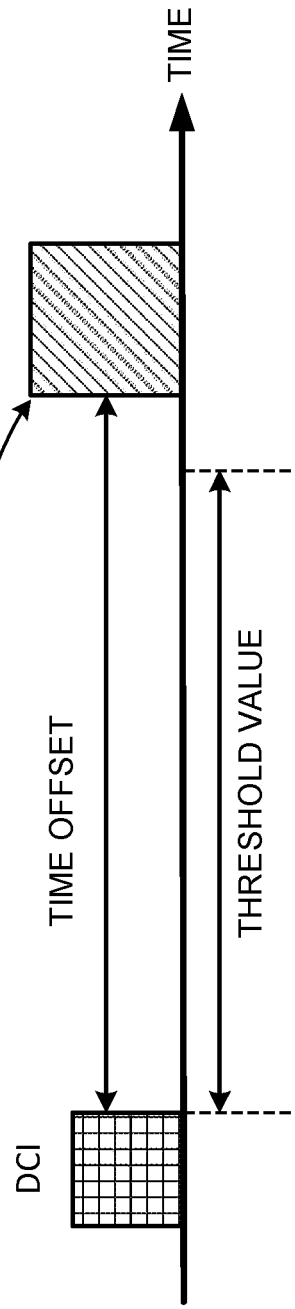

USER TERMINAL AND RADIO COMMUNICATION METHOD

TECHNICAL FIELD

The present disclosure relates to user terminal and a radio communication method in a next-generation mobile communication system.

BACKGROUND ART

In the universal mobile telecommunications system (UMTS) network, the specifications of long term evolution (LTE) have been drafted for the purpose of further increasing data rates, providing low delays, and so on (see Non Patent Literature 1). In addition, the specifications of LTE-Advanced (third generation partnership project (3GPP) Release (Rel.) 10 to 14) have been drafted for the purpose of further increasing capacity and advancement of LTE (3GPP Rel. 8 and 9).

Successor systems to LTE (for example, also referred to as 5th generation mobile communication system (5G), 5G+ (plus), New Radio (NR), or 3GPP Rel. 15 or later) are also being studied.

In an existing LTE system (for example, LTE Rel. 8 to 14), a user terminal (user equipment (UE)) controls transmission of an uplink shared channel (physical uplink shared channel (PUSCH)) based on downlink control information (DCI).

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010.

SUMMARY OF INVENTION

Technical Problem

In a future radio communication system (for example, NR), it has been studied to designate one of a plurality of candidates configured by higher layer signaling for a beam (spatial relation) of uplink (UL) transmission such as a PUCCH, a PUSCH, and an SRS by a medium access control (MAC) control element (CE), downlink control information (DCI), or the like.

However, the number of candidates that can be configured is limited. Because many candidates are used, in a case where reconfiguration is performed by higher layer signaling, delay, resource consumption, or the like can occur.

Therefore, an object of the present disclosure is to provide a user terminal and a radio communication method for appropriately performing control of a UL beam.

Solution to Problem

A user terminal according to an aspect of the present disclosure includes a control unit that determines, based on at least one of comparison of a time offset with a threshold between a timing related to a spatial relation of uplink transmission and the uplink transmission and that usage of a sounding reference signal (SRS) resource set for the uplink transmission is a specific usage, one of a transmission control indication (TCI) state or a quasi-co-location (QCL) assumption for downlink transmission and indicated spatial relation information as the spatial relation, and a transmitting unit that performs the uplink transmission by using the spatial relation.

Advantageous Effects of Invention

According to one aspect of the present disclosure, the UL beam can be appropriately controlled.

BRIEF DESCRIPTION OF DRAWINGS

FIGS. 6A and 6B are diagrams illustrating an example of a time offset 3.

FIGS. 8A and 8B are diagrams illustrating an example of determination of the spatial relation with respect to an SRS of beam management.

FIGS. 9A and 9B are diagrams illustrating another example of determination of the spatial relation with respect to the SRS of beam management.

Figure 1:
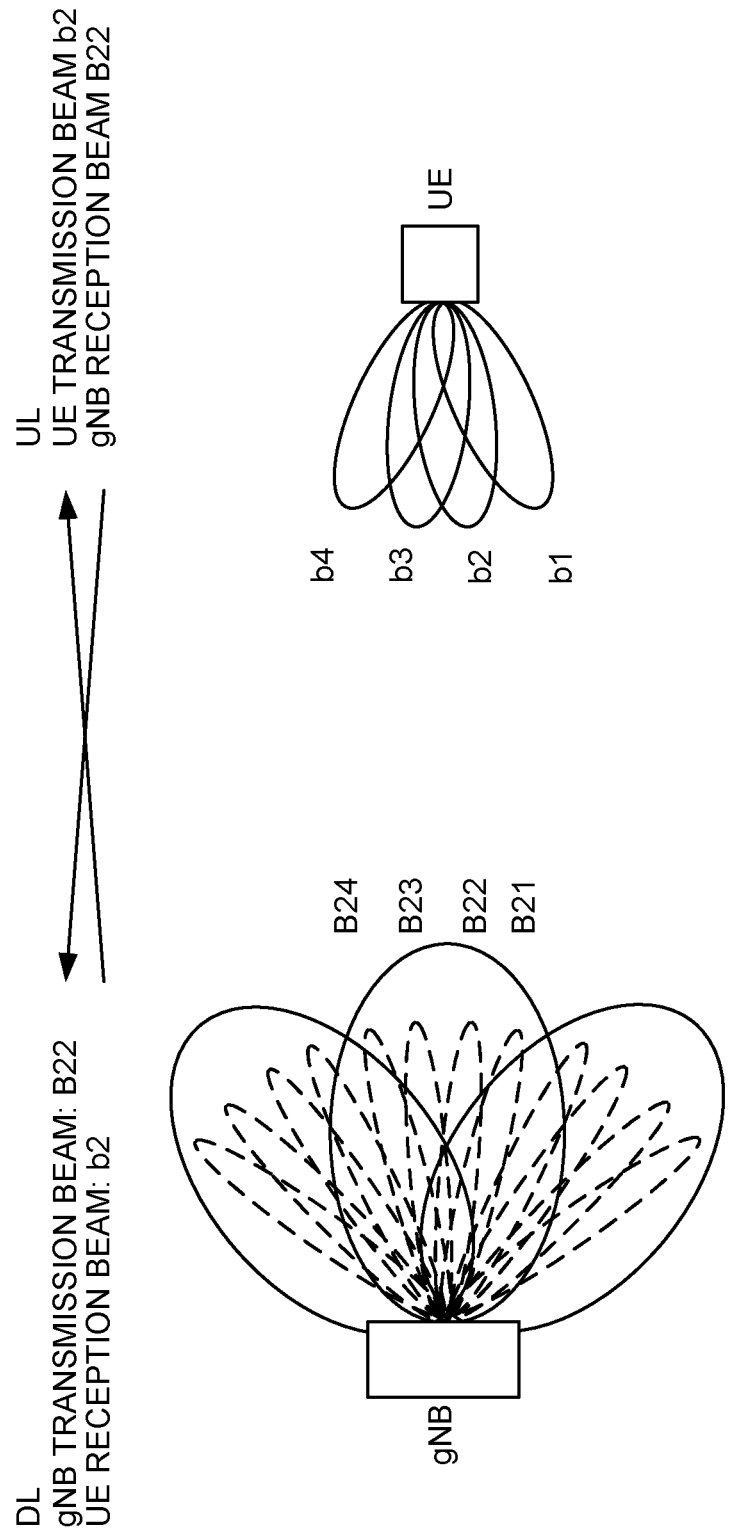
FIG. 1 is a diagram illustrating an example of beam correspondence.

DESCRIPTION OF EMBODIMENTS (TCI, Spatial Relation, and QCL)

In NR, it has been studied to control reception processing (for example, at least one of reception, demapping, demodulation, and decoding) and transmission processing (for example, at least one of transmission, mapping, precoding, modulation, and coding) in UE of at least one of a signal and a channel (expressed as a signal/channel) based on a transmission configuration indication state (TCI state).

The TCI state may represent what is applied to a downlink signal/channel. One corresponding to the TCI state applied to an uplink signal/channel may be expressed as a spatial relation.

The TCI state is information regarding a quasi-co-location (QCL) of the signal/channel, and may also be referred to as, for example, a spatial Rx parameter, spatial relation information (SRI), or the like. The TCI state may be configured in the UE for each channel or each signal.

The QCL is an indicator indicating a statistical property of a signal/channel. For example, a case where one signal/channel and another signal/channel have a QCL relation may mean that it is possible to assume that at least one of Doppler shift, Doppler spread, an average delay, a delay spread, or a spatial parameter (for example, a spatial Rx parameter) is identical (in QCL with respect to at least one of these) between the plurality of different signals/channels.

Note that the spatial Rx parameter may correspond to a reception beam of the UE (for example, a reception analog beam), and the beam may be specified based on spatial QCL. The QCL (or at least one element of the QCL) in the present disclosure may be replaced with spatial QCL (sQCL).

A plurality of types of QCL (QCL types) may be defined. For example, four QCL types A to D with different parameters (or parameter sets) that can be assumed to be identical may be provided. These parameters are as follows:

QCL type A: Doppler shift, Doppler spread, average delay, and delay spread;
QCL type B: Doppler shift and Doppler spread;
QCL type C: Doppler shift and average delay; and
QCL type D: spatial Rx parameter.

It may be referred to as a QCL assumption for the UE to assume that a given control resource set (CORESET), channel, or reference signal has a specific QCL (for example, QCL type D) relation with another CORESET, channel, or reference signal.

The UE may determine at least one of a transmission beam (Tx beam) and a reception beam (Rx beam) of a signal/channel based on a TCI state of the signal/channel or the QCL assumption.

The TCI state may be, for example, information regarding QCL of a target channel (or a reference signal (RS) for the channel) and another signal (for example, another downlink reference signal (DL-RS). The TCI state may be configured (indicated) by higher layer signaling, physical layer signaling, or a combination thereof.

In the present disclosure, the higher layer signaling may be any of, for example, radio resource control (RRC) signaling, medium access control (MAC) signaling, broadcast information, and the like, or a combination thereof.

For the MAC signaling, for example, a MAC Control Element (MAC CE), a MAC Protocol Data Unit (PDU), or the like may be used. The broadcast information may be, for example, a master information block (MIB), a system information block (SIB), remaining minimum system information (RMSI), other system information (OSI), or the like.

The physical layer signaling may be, for example, downlink control information (DCI).

A channel for which a TCI state is configured (designated) may be, for example, at least one of a downlink shared channel (physical downlink shared channel (PDSCH)), a downlink control channel (physical downlink control channel (PDCCH)), an uplink shared channel (physical uplink shared channel (PUSCH)), and an uplink control channel (physical uplink control channel (PUCCH)).

Further, RS (DL-RS) that has a QCL relation with the channel may be, for example, at least one of a synchronization signal block (SSB), a channel state information reference signal (CSI-RS), and a measurement reference signal (sounding reference signal (SRS)). Alternatively, the DL-RS may be a CSI-RS (also referred to as a tracking reference signal (TRS)) used for tracking or a reference signal (also referred to as a QRS) used for QCL detection.

The SSB is a signal block including at least one of a primary synchronization signal (PSS), a secondary synchronization signal (SSS), and a broadcast channel (physical broadcast channel (PBCH)). The SSB may be referred to as an SS/PBCH block.

An information element in a TCI state configured by higher layer signaling ("TCI-state IE" of RRC) may include one or more pieces of QCL information ("QCL-Info"). The QCL information may include at least one of information about DL-RS having a QCL relation (DL-RS-related information) and information indicating a QCL type (QCL type information). The DL-RS-related information may include information such as an index of the DL-RS (for example, an SSB index or a non-zero-power (NZP) CSI-RS resource identifier (ID)), an index of a cell where the RS is located, or an index of a bandwidth part (BWP) where the RS is located.

<TCI State for PDCCH>

Information regarding QCL between PDCCH (or a demodulation reference signal (DMRS) antenna port related to the PDCCH) and a given DL-RS may be referred to as a TCI state for the PDCCH.

The UE may determine a TCI state for UE-specific PDCCH (CORESET) based on higher layer signaling. In one example, for the UE, one or a plurality of (K) TCI states can be configured for each CORESET by RRC signaling.

The UE may cause one of the plurality of TCI states configured by RRC signaling to be activated by the MAC CE for each CORESET. The MAC CE may be referred to as a TCI state indication for UE-specific PDCCH MAC CE. The UE may monitor CORESET based on an active TCI state corresponding to the CORESET.

<TCI State for PDSCH>

Information regarding QCL between a PDSCH (or a DMRS antenna port associated with the PDSCH) and a given DL-RS may be referred to as a TCI state for the PDSCH.

The UE may be notified (configured) of M (M≥1) TCI states for PDSCHs (QCL information for M PDSCHs) by higher layer signaling. Note that the number M of TCI states configured for the UE may be limited by at least one of UE capability and a QCL type.

The DCI used for scheduling of the PDSCH may include a given field (which may be referred to as, for example, a TCI field, a TCI state field, or the like) indicating the TCI state for the PDSCH. The DCI may be used for scheduling the PDSCH of one cell, and may be referred to as, for example, DL DCI, DL assignment, DCI format 1_0, or DCI format 1_1.

Whether or not the TCI field is included in the DCI may be controlled by information provided from a base station to the UE. The information may be information (for example, TCI presence information, in-DCI TCI presence information, a higher layer parameter TCI-PresentInDCI) indicating whether the TCI field is present or absent in the DCI. The information may be configured in the UE by, for example, higher layer signaling.

When more than eight types of TCI states are configured for the UE, MAC CE may be used to activate (or designate) eight or less TCI states. The MAC CE may be referred to as a TCI states activation/deactivation for UE-specific PDSCH MAC CE. A value of the TCI field in the DCI may indicate one of the TCI states activated by MAC CE.

When the UE is configured with the TCI presence information set to "enabled" for the CORESET for scheduling the PDSCH (CORESET used for PDCCH transmission for scheduling PDSCH), the UE may assume that the TCI field is present in DCI format 1_1 of the PDCCH transmitted on the CORESET.

When the TCI presence information is not configured for the CORESET for scheduling the PDSCH or the PDSCH is scheduled by DCI format 1_0, if the time offset between the reception of the DL DCI (the DCI for scheduling the PDSCH) and the reception of the PDSCH corresponding to the DCI is equal to or greater than the threshold, the UE may assume that the TCI state or the QCL assumption for the PDSCH is the same as the TCI state or the QCL assumption applied to the CORESET used for the PDCCH transmission for scheduling the PDSCH in order to determine the QCL of the PDSCH antenna port.

When the TCI presence information is set to "enabled", the TCI field in the DCI in the component carrier (CC) for scheduling (the PDSCH) indicates the activated TCI state in the scheduled CC or DL BWP, and when the PDSCH is scheduled by DCI format 1_1, the UE may use the TCI with the DCI and according to the value of the TCI field in the detected PDCCH in order to determine the QCL of the PDSCH antenna port. When the time offset between the reception of the DL DCI (scheduling the PDSCH) and the PDSCH corresponding to the DCI (PDSCH scheduled by the DCI) is equal to or greater than the threshold, the UE may assume that the DM-RS port of the PDSCH of the serving cell is QCL with the RS in the TCI state with respect to the QCL type parameter given by the indicated TCI state.

When the UE is configured with a single-slot PDSCH, the indicated TCI state may be based on the activated TCI state in the slot with the scheduled PDSCH. When a multi-slot PDSCH is configured in the UE, the indicated TCI state may be based on the activated TCI state in the first slot having the scheduled PDSCH, and the UE may expect that it is the same across the slots having the scheduled PDSCH. When the UE is configured with a CORESET associated with a search space set for cross-carrier scheduling, when the TCI presence information is set to "enabled" for the CORESET for the UE and at least one of the TCI states configured for the serving cell scheduled by a search space set includes QCL type D, the UE may assume that the time offset between the detected PDCCH and the PDSCH corresponding to the PDCCH is equal to or greater than the threshold.

In both a case where the TCI information in the DCI (higher layer parameter TCI-PresentInDCI) is set to "enabled" and a case where the TCI information in the DCI is not configured in the RRC connection mode, when the time offset between reception of DL DCI (DCI for scheduling the PDSCH) and the corresponding PDSCH (PDSCH scheduled by the DCI) is less than the threshold, the UE may assume that the DM-RS port of the PDSCH of the serving cell has a minimum (lowest) CORESET-ID in a newest (latest) slot in which one or more CORESETs in an active BWP of the serving cell are monitored by the UE, and is in QCL with the RS related to a QCL parameter used for QCL indication of the PDCCH of the CORESET associated with a monitored search space.

The time offset between the reception of the DL DCI and the reception of the PDSCH corresponding to the DCI may be referred to as a scheduling offset.

Further, the above-mentioned threshold may be referred to as a QCL time length, "timeDurationForQCL", "Threshold", "Threshold for offset between a DCI indicating a TCI state and a PDSCH scheduled by the DCI", "Threshold-Sched-Offset", a schedule offset threshold, a scheduling offset threshold, or the like.

The scheduling offset threshold may be based on the UE capability, and may be based on, for example, the delay caused by decoding the PDCCH and beam switching. The information of the scheduling offset threshold may be configured from the base station using higher layer signaling, or may be transmitted from the UE to the base station.

For example, the UE may assume that the DMRS ports of the PDSCH are QCL with the DL-RS based on the TCI state activated for the CORESET corresponding to the lowest CORESET-ID. The latest slot may be, for example, a slot that receives the DCI for scheduling the PDSCH.

Note that the CORESET-ID may be an ID (ID for identifying CORESET) configured by RRC information element "ControlResourceSet".

<Spatial Relation for PUCCH>

The UE may be configured with a parameter (PUCCH configuration information, PUCCH-Config) used for PUCCH transmission by higher layer signaling (for example, radio resource control (RRC) signaling). The PUCCH configuration information may be configured for each partial band (for example, an uplink bandwidthpart (BWP)) in a carrier (also referred to as a cell, a component carrier, and the like).

The PUCCH configuration information may include a list of PUCCH resource set information (for example, PUCCH-ResourceSet) and a list of PUCCH spatial relation information (for example, PUCCH-SpatialRelationInfo).

The PUCCH resource set information may include a list (for example, resourceList) of a PUCCH resource index (ID, for example, PUCCH-ResourceId).

Further, when the UE does not have dedicated PUCCH resource configuration information (for example, a dedicated PUCCH resource configuration) provided by the PUCCH resource set information in the PUCCH configuration information (before RRC setup), the UE may determine the PUCCH resource set based on a parameter (for example, pucch-ResourceCommon) in the system information (for example, system information block type 1 (SIB1) or remaining minimum system information (RMSI)). The PUCCH resource set may include 16 PUCCH resources.

On the other hand, when the UE has the dedicated PUCCH resource configuration information (UE-dedicated uplink control channel configuration, dedicated PUCCH resource configuration) (after RRC setup), the UE may determine the PUCCH resource set according to the number of UCI information bits.

The UE may determine one PUCCH resource (index) in the PUCCH resource set (for example, a cell-specific PUCCH resource set or a PUCCH resource set determined for individual UE) based on at least one of a value of a given field (for example, a PUCCH resource indicator field) in Downlink Control Information (DCI) (for example, the DCI format 1_0 or 1_1 used for PDSCH scheduling), the number of CCEs ($N_{CCE}$) in a control resource set (control resource set (CORESET)) for reception of a PDCCH that carries the DCI, or an index ($n_{CCE,0}$) of a head (first) CCE of the reception of the PDCCH.

The PUCCH spatial relation information (for example, the RRC information element "PUCCH-spatialRelationInfo") may indicate a plurality of candidate beams (spatial domain filters) for PUCCH transmission. The PUCCH spatial relation information may indicate a spatial relation between a reference signal (RS) and a PUCCH.

The list of PUCCH spatial relation information may include several elements (PUCCH spatial relation information IE (information element)). Each piece of the PUCCH spatial relation information may include, for example, at least one of an index (ID, for example, pucch-SpatialRelationInfoId) of the PUCCH spatial relation information, an index (ID, for example, servingCellId) of the serving cell, and information related to the RS (reference RS) that has a spatial relation with the PUCCH.

For example, the information regarding the RS may be the SSB index, the CSI-RS index (for example, NZP-CSI-RS resource configuration ID), or the SRS resource ID and the ID of the BWP. The SSB index, the CSI-RS index, and the SRS resource ID may be associated with at least one of a beam, a resource, and a port selected by measurement of a corresponding RS.

The UE may be indicated, by a medium access control (MAC) control element (CE), with one of the one or more pieces of PUCCH spatial relation information (for example, PUCCH-SpatialRelationInfo or a candidate beam) in the list of the PUCCH spatial relation information. The MAC CE may be a MAC CE that activates or deactivates the PUCCH spatial relation information (PUCCH spatial relation information activation/deactivation MAC CE, PUCCH spatial relation information indication MAC CE).

After 3 ms from transmission of an acknowledgment (ACK) for the MAC CE activating the given PUCCH spatial relation information, the UE may activate the PUCCH relation information indicated by the MAC CE.

The UE may control the transmission of the PUCCH based on the PUCCH spatial relation information activated by the MAC CE. Note that when a single piece of PUCCH spatial relation information is included in the list of the PUCCH spatial relation information, the UE may control the transmission of the PUCCH based on the PUCCH spatial relation information.

<Spatial Relation for SRS and PUSCH>

The UE may receive information (SRS configuration information, for example, a parameter in the RRC control element "SRS-Config") used for transmission of a measurement reference signal (for example, a sounding reference signal (SRS)).

Specifically, the UE may receive at least one of information related to one or a plurality of SRS resource sets (SRS resource set information, for example, the RRC control element "SRS-ResourceSet") and information related to one or a plurality of SRS resources (SRS resource information, for example, the RRC control element "SRS-Resource").

One SRS resource set may be associated with a given number of SRS resources (a given number of SRS resources may be grouped). Each SRS resource may be specified by an SRS resource identifier (SRS resource indicator (SRI)) or an SRS resource identifier (ID).

The SRS resource set information may include information of an SRS resource set ID (SRS-ResourceSetId), a list of SRS resource IDs (SRS-ResourceId) used in the resource set, an SRS resource type (for example, one of periodic SRS, semi-persistent SRS, and aperiodic CSI (Aperiodic SRS)), and SRS usage.

Here, the SRS resource type may indicate any one of a periodic SRS (P-SRS), a semi-persistent SRS (SP-SRS), and an aperiodic CSI (A-SRS). Note that the UE may transmit a P-SRS and an SP-SRS periodically (or periodically after activated), and transmit an A-SRS based on an SRS request in the DCI.

Furthermore, the usage ("usage" of an RRC parameter and "SRS-SetUse" of the L1 (Layer-1) parameter) may be, for example, beam management (beamManagement), codebook based transmission (codebook: CB), non-codebook based transmission (nonCodebook: NCB), antenna switching (antennaSwitching), or the like. An SRS used for the codebook based transmission or the non-codebook based transmission may be used to determine a precoder for codebook-based or non-codebook-based PUSCH transmission based on an SRI.

For example, in the case of codebook based transmission, the UE may determine the precoder for PUSCH transmission based on SRI, transmitted rank indicator (TRI) and transmitted precoding matrix indicator (TPMI). For the non-codebook based transmission, the UE may determine a precoder for PUSCH transmission based on the SRI.

The SRS resource information may include an SRS resource ID (SRS-ResourceId), the number of SRS ports, an SRS port number, transmission Comb, SRS resource mapping (for example, time and/or frequency resource position, resource offset, resource periodicity, the number of repetitions, the number of SRS symbols, and SRS bandwidth), hopping related information, an SRS resource type, a sequence ID, and SRS spatial relation information.

The SRS spatial relation information (for example, the RRC information element "spatialRelationInfo") may indicate spatial relation information between a given reference signal and the SRS. The given reference signal may be at least one of a Synchronization Signal/Physical Broadcast Channel (SS/PBCH) block, a Channel State Information Reference Signal (CSI-RS), or an SRS (for example, another SRS). The SS/PBCH block may be referred to as a synchronization signal block (SSB).

The SRS spatial relation information may include at least one of an SSB index, a CSI-RS resource ID, and an SRS resource ID as an index of the given reference signal.

Note that, in the present disclosure, an SSB index, an SSB resource ID, and an SSB resource indicator (SSBRI) may be replaced with each other. Furthermore, a CSI-RS index, a CSI-RS resource ID, and a CSI-RS resource indicator (CRI) may be replaced with each other. Further, an SRS index, an SRS resource ID and an SRI may be replaced with each other.

The SRS spatial relation information may include a serving cell index and a BWP index (BWP ID) corresponding to the above-described given reference signal.

In NR, the transmission of the uplink signal may be controlled based on the presence or absence of beam correspondence (BC). The BC may be, for example, a capability of a certain node (for example, a base station or UE) to determine a beam (transmission beam, Tx beam) used for signal transmission based on a beam (reception beam, Rx beam) used for signal reception.

Note that BC may be referred to as transmission/reception beam correspondence (Tx/Rx beam correspondence), beam reciprocity, beam calibration, calibrated/non-calibrated, reciprocity calibrated/non-calibrated, a correspondence degree, a matching degree, or the like.

As illustrated in FIG. 1, in BC, a gNB performs transmission beam sweeping by using beams B21 to B24, and the UE performs reception beam sweeping by using beams b1 to b4, so that the gNB and the UE determine the beam B22 of the gNB as a DL transmission beam and determine the beam b2 of the UE as a DL reception beam based on a measurement result. The gNB also uses the determined beam B22 as a UL reception beam and the UE also uses the determined beam b2 as a UL transmission beam.

For example, when there is no BC, the UE may transmit an uplink signal (for example, PUSCH, PUCCH, SRS, and the like) using the same beam (spatial domain transmission filter) as the SRS (or the SRS resource) indicated from the base station based on the measurement results of one or more SRSs (or the SRS resources).

On the other hand, when there is BC, the UE may transmit an uplink signal (for example, PUSCH, PUCCH, SRS, and the like) using a beam (spatial domain transmission filter)

identical or corresponding to the beam (spatial domain reception filter) used for reception of a given SSB or CSI-RS (or CSI-RS resource).

When spatial relation information regarding the SSB or CSI-RS and the SRS is configured for a certain SRS resource (for example, when there is BC), the UE may transmit the SRS resource by using the same spatial domain filter (spatial domain transmission filter) as a spatial domain filter (spatial domain reception filter) for receiving the SSB or CSI-RS. In this case, the UE may assume that the UE reception beam of the SSB or CSI-RS is the same as the UE transmission beam of the SRS.

When spatial relation information regarding another SRS (reference SRS) and the SRS (target SRS) is configured for a certain SRS (target SRS) resource (for example, when there is no BC), the UE may transmit the target SRS resource by using the same spatial domain filter (spatial domain transmission filter) as the spatial domain filter (spatial domain transmission filter) for transmitting the reference SRS. That is, in this case, the UE may assume that the UE transmission beam of the reference SRS is the same as the UE transmission beam of the target SRS.

The UE may determine the spatial relation of the PUSCH scheduled by the DCI based on a value of a given field (for example, SRS resource identifier (SRI) field) in the DCI (for example, DCI format 0_1). Specifically, the UE may use the spatial relation information (for example, the RRC information element "spatialRelationInfo") of the SRS resource determined based on the value (for example, SRI) of the given field for the PUSCH transmission.

(Method for Determining Spatial Relation)

As described above, for the PDCCH or the PDSCH, the UE may be configured with a plurality of TCI states by the RRC and indicated with one of the plurality of TCI states by the MAC CE or the DCI. Therefore, the beam can be quickly switched without performing RRC reconfiguration.

The maximum number of TCI states configurable by the RRC (maxNrofTCI-States) is 128 and the maximum number of TCI states for the PDCCH (maxNrofTCI-StatesPDCCH) is 64.

For the PUCCH, the UE may be configured with eight spatial relations for one PUCCH resource by the RRC and indicated with one spatial relation by the MAC CE. In order to use a spatial relation other than the eight spatial relations configured by the RRC, RRC reconfiguration is required.

When using codebook based transmission for the PUSCH, the UE may be configured with two SRS resources by the RRC and indicated with one of the two SRS resources by the DCI (1-bit field). When using non-codebook based transmission for the PUSCH, the UE may be configured with four SRS resources by the RRC and indicated with one of the four SRS resources by the DCI (2-bit field). In order to use a spatial relation other than the two or four spatial relations configured by the RRC, RRC reconfiguration is required.

The DL-RS can be configured for the spatial relation of the SRS resource used for the PUSCH. For the SP-SRS, the UE may be configured with a spatial relation of a plurality of (for example, up to 16) SRS resources by the RRC and indicated with one of the plurality of SRS resources by the MAC CE. For the A-SRS and the P-SRS, the UE cannot be indicated with the spatial relation of the SRS resource by the MAC CE.

As described above, there is a possibility that it is necessary to configure many spatial relation candidates at a time as the spatial relation for the UL transmission (PUCCH, PUSCH, or SRS). For example, in a case where the DL-RS (TCI state of DL) is used as the spatial relation of the UL transmission by beam correspondence, there is a possibility that many DL-RSs (for example, 32 SSBs) are configured.

However, as described above, the number of spatial relation candidates that can be configured at a time for the UL transmission is limited, and is smaller than the number of TCI state candidates that can be configured at a time for the DL transmission. In order to use a spatial relation that is not configured for the UL transmission, it is conceivable to configure another spatial relation by RRC reconfiguration. When the RRC reconfiguration is performed, there is a possibility that an uncommunicable time occurs, resources are consumed, and the performance of the system deteriorates.

Accordingly, the present inventors have conceived a method in which the UE assumes that the spatial relation of specific uplink transmission is the same as a transmission control indication (TCI) state or quasi-co-location (QCL) assumption of a specific downlink channel.

Hereinafter, embodiments according to the present disclosure will be described in detail with reference to the drawings. A radio communication method according to each embodiment may be applied independently, or may be applied in combination with others.

In the present disclosure, the spatial relation may be replaced with spatial relation information, spatial relation assumption, spatial domain transmission filter, UE spatial domain transmission filter, spatial domain filter, UE transmission beam, UL transmission beam, DL-RS, QCL assumption, SRI, spatial relation based on SRI, or the like.

The TCI state may be replaced with a TCI state or a QCL assumption, a QCL assumption, a spatial domain reception filter, a UE spatial domain reception filter, a spatial domain filter, a UE reception beam, a DL reception beam, a DL-RS, or the like. The RS of QCL type D, the DL-RS associated with QCL type D, the DL-RS with QCL type D, a source of the DL-RS, the SSB, and the CSI-RS may be replaced with each other.

In the present disclosure, the TCI state may be information (for example, a DL-RS, a QCL type, a cell in which a DL-RS is transmitted, or the like) about a reception beam (spatial domain reception filter) indicated (configured) for the UE. The QCL assumption is based on transmission or reception of an associated signal (for example, PRACH), and may be information (for example, a DL-RS, a QCL type, a cell in which a DL-RS is transmitted, or the like) about a reception beam (spatial domain reception filter) assumed by the UE.

In the present disclosure, the PCell, the primary secondary cell (PSCell), and the special cell (SpCell) may be replaced with each other.

In the present disclosure, x or more and more than x may be replaced with each other. In the present disclosure, less than x and x or less may be replaced with each other.

Radio Communication Method

Embodiment 1

The UE may use a default spatial relation or a spatial relation of a reference UL transmission as a spatial relation of specific UL transmission. The UE may assume (may consider) that the spatial relation of the specific UL transmission is the same as the RS of the default spatial relation or the RS of the spatial relation of the reference UL transmission.

The specific UL transmission may be replaced with a specific UL signal or a specific UL channel, or may be replaced with at least one of a PUSCH, a PUCCH, an SRS, an SRS resource set (with usage information (usage) indicating codebook based transmission or non-codebook based transmission) whose usage is codebook based transmission (codebook) or non-codebook based transmission (nonCodebook), or an SRS resource in the SRS resource set whose usage is codebook based transmission or non-codebook based transmission.

The spatial relation of the specific UL transmission, the RS of the spatial relation of the specific UL transmission, the spatial relation of the SRS configuration information, the PUCCH spatial relation information, the spatial relation of the PUSCH, the spatial relation information of the specific UL transmission, the RS of the spatial relation of the specific UL transmission, and the spatial domain transmission filter of the specific UL transmission may be replaced with each other. When the specific UL transmission is the PUSCH, the spatial relation of the specific UL transmission may be replaced with the SRI, the spatial relation of the SRI, and the spatial domain transmission filter.

The default spatial relation, a specific RS, the TCI state or the QCL assumption of a specific DL transmission, the RS related to the QCL parameter (QCL parameter) given by the TCI state or the QCL assumption of the specific DL transmission, and the RS of QCL type D in the TCI state or the QCL assumption of the specific DL transmission may be replaced with each other.

The specific DL transmission may be replaced with at least one of a specific DL channel, a specific RS, a specific DL RS, the PDCCH, or the PDSCH.

The reference UL transmission may be the UL transmission satisfying a given condition, the latest PUSCH transmission, the latest PUCCH transmission, the latest PRACH transmission, the latest SRS transmission, the latest UL transmission, or the latest transmission of at least one of PUSCH, PUCCH, PRACH, or SRS.

As the RS of the spatial relation of the specific UL transmission for determining the UL transmission beam (spatial domain transmission filter), it is preferable to use the RS of QCL type D in the TCI state or QCL assumption of the specific DL transmission for determining the UE reception beam (spatial domain reception filter). In particular, when the TCI state or the QCL assumption of the specific DL transmission has both the RS of QCL type A and the RS of QCL type D and the RS of QCL type A and the RS of QCL type D are different from each other, it is preferable to use the RS of QCL type D in the TCI state or the QCL assumption of the specific DL transmission as the RS of the spatial relation of the specific UL transmission.

For example, as described above, when the TCI state indicates the RS of QCL type A, which is the TRS of the serving cell (for example, SCell) in which the TCI state is configured and the RS of QCL type D, which is the CSI-RS of another serving cell (for example, PCell) in which repetition is configured, the RS of QCL type A and the RS of QCL type D are different from each other. Since it is conceivable that the parameter of QCL type A varies depending on the cell, the RS of QCL type A is preferably transmitted in the cell in which the TCI state is configured. On the other hand, the RS of QCL type D may be transmitted in a serving cell other than the cell in which the TCI state is configured. Note that the serving cell in which the TCI state is configured may be the PCell, and the serving cell in which the RS of QCL type D is transmitted may be the SCell.

Figure 2:
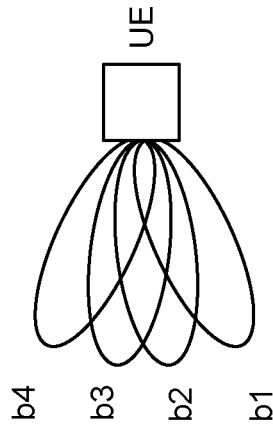
FIG. 2 is a diagram illustrating an example of a spatial relation of specific UL transmission.

As illustrated in FIG. 2, the UE may use the RS of QCL type D in the TCI state (for example, DL-RS, spatial domain reception filter, spatial domain filter, or UE reception beam) of the specific DL transmission as the RS of the spatial relation (for example, DL-RS, spatial domain transmission filter, spatial domain filter, or UE transmission beam) of the specific UL transmission.

<<Conditions for Applying Default Spatial Relation>>

When the UE is implicitly or explicitly configured to use the default spatial relation for the spatial relation of the specific UL transmission, the UE may use the default spatial relation for the spatial relation of the specific UL transmission (may assume that the spatial relation of the specific UL transmission is the same as the default spatial relation). A case where the UE is implicitly configured to use the default spatial relation for the spatial relation of the specific UL transmission may be, for example, a case where the UE is not configured for the spatial relation of the specific UL transmission (for example, spatialRelationInfo and PUCCH-SpatialRelationInfo). A case where the UE is explicitly configured to use the default spatial relation for the spatial relation of the specific UL transmission may be a case where the specific parameter is configured by a specific higher layer parameter.

In frequency range 1 (FR1, a frequency of 6 GHz or less), the UE may not use analog beam forming for UL transmission, or may not be configured with a spatial relation for UL transmission.

In frequency range 2 (FR2, a frequency higher than 6 GHz (or a frequency higher than 24 GHz)), the UE may assume that the spatial relation of the specific UL transmission is the same as the default spatial relation (the RS of the spatial relation of the specific UL transmission is the same as the RS of QCL type D in the TCI state of the specific DL transmission). In FR2, when the UE is implicitly or explicitly configured to use the default spatial relation for the spatial relation of the specific UL transmission, the UE may assume that the spatial relation of the specific UL transmission is the same as the default spatial relation.

When the RS of QCL type D in the TCI state of the specific DL transmission can be applied, the UE may assume that the RS of the spatial relation of the specific UL transmission is the same as the RS of QCL type D in the TCI state of the specific DL transmission. When the RS of QCL type D in the TCI state of the specific DL transmission can be applied and it is implicitly or explicitly configured to use the default spatial relation for the spatial relation of the specific UL transmission, the UE may assume that the spatial relation of the specific UL transmission is the same as the default spatial relation.

In FR2, when the RS of QCL type D in the TCI state of the specific DL transmission can be applied, the UE may assume that the RS of the spatial relation of the specific UL transmission is the same as the RS of QCL type D in the TCI state of the specific DL transmission. In FR2, when the RS of QCL type D in the TCI state of the specific DL transmission can be applied and it is implicitly or explicitly configured to use the default spatial relation for the spatial relation of the specific UL transmission, the UE may assume that the RS of the spatial relation of the specific UL transmission is the same as the RS of QCL type D in the TCI state of the specific DL transmission.

The specific UL transmission may be an SRS using an SRS resource set (or an SRS resource in the SRS resource set) whose usage is not beam management (beamManagement) (is codebook based transmission (codebook) or non-codebook based transmission (nonCodebook) or antenna switching (antennaSwitching)). When the UE is implicitly or explicitly configured to use the default spatial relation for the spatial relation of the SRS, the UE may assume that the spatial relation of the SRS is the same as the default spatial relation. In FR2, when the UE is implicitly or explicitly configured to use the default spatial relation for the spatial relation of the SRS, the UE may assume that the spatial relation of the SRS is the same as the default spatial relation.

If the usage of the SRS resource set is beam management, if the UE uses the default spatial relation for the spatial relation of the SRS, the same beam (default spatial relation) is used in the symbols of all the SRSs, and the beam of the SRS cannot be swept. The UE can sweep the beam when the usage of the SRS resource set is beam management by using the default spatial relation for the spatial relation of the SRS only when the usage of the SRS resource set is not beam management.

When a given function after Rel. 16 is configured, the UE may assume that the spatial relation of the specific UL transmission is the same as the default spatial relation (the RS of the spatial relation of the specific UL transmission is the same as the RS of QCL type D in the TCI state of the specific DL transmission). When the given function is configured and it is implicitly or explicitly configured to use the default spatial relation for the spatial relation of the specific UL transmission, the UE may assume that the spatial relation of the specific UL transmission is the same as the default spatial relation.

The given function may be a beam-related function after Rel. 16. The given function may be configured in the UE by higher layer signaling. The beam-related function may be at least one of low latency beam selection, Layer 1 (L1)-signal to interference plus noise ratio (SINR) beam reporting (L1-SINR beam reporting), BFR on a secondary cell (SCell) (BFR on SCell). The low latency beam selection may be referred to as fast beam selection, beam selection w/o TCI state, beam selection type II, TCI state indication type 2, or the like. The L1-SINR beam reporting may be that the UE reports a measurement result (CSI, L1-SINR corresponding to beam) of the L1-SINR for beam management. The BFR on SCell may be at least one of detecting a beam failure (BF) in the SCell, transmitting a beam failure recovery request (BFRQ) to the SCell, and receiving a beam failure recovery (BFR) response from the SCell.

The UE may report specific UE capability (capability) information. The specific UE capability information may indicate support for the assumption that the spatial relation of the specific UL transmission is the same as the default spatial relation (the RS of the spatial relation of the specific UL transmission is the same as the RS of QCL type D in the TCI state of the specific DL transmission), or may indicate support for the given function described above. The specific UE capability information may be a parameter indicating support for the default spatial relation, or may be a parameter having a name indicating either the default spatial relation or the default spatial relation information (default spatial relation info). When reporting the specific UE capability information, the UE may assume that the spatial relation of the specific UL transmission is the same as the default spatial relation. When reporting the specific UE capability information and being implicitly or explicitly configured to use the default spatial relation for the spatial relation of the specific UL transmission, the UE may assume that the spatial relation of the specific UL transmission is the same as the default spatial relation. When not reporting the specific UE capability information, the UE may assume that the spatial relation of the specific UL transmission is configured.

The UE that supports the default spatial relation may report UE capability information indicating that the default spatial relation is supported.

The UE that supports the default spatial relation may report the UE capability information indicating a channel type supporting the default spatial relation. The channel type may be at least one of PUCCH, SRS, or PUSCH.

The UE that supports the default spatial relation may report the UE capability information indicating a QCL source type supporting the default spatial relation. The QCL source type may be at least one of CORESET, PDCCH, or PDSCH.

The UE that does not support the default spatial relation (for example, a UE that does not report to support the default spatial relation, a UE that reports not to support the default spatial relation) may use the spatial relation of the reference UL transmission instead of the default spatial relation. In other words, a UE that does not support the default spatial relation may assume that the spatial relation of the specific UL transmission is the same as the spatial relation of the reference UL transmission.

By reporting the specific UE capability information, an overhead of notification (at least one of setting or activation) related to spatial relation information can be reduced.

<<TCI State, QCL Assumption, or RS Used as Default Spatial Relation>>

The default spatial relation may be the TCI state of the specific DL transmission or may be the QCL assumption of the specific DL transmission. This TCI state or QCL assumption may be explicitly configured (activated or indicated) to the UE by at least one of RRC signaling, MAC CE, or DCI, or may be determined by the UE based on measurement of SSB or CSI-RS. This TCI state or QCL assumption may be the RS used for the reference UL transmission.

The default spatial relation may be replaced with an active TCI state (activated TCI state), an active TCI state or QCL assumption, a default TCI state, a default QCL assumption, or the like.

A plurality of TCI states may be active with respect to the specific DL transmission. In this case, the default spatial relation may be the default TCI state (default RS, default TCI state or QCL assumption).

The default TCI state may be replaced with the RS related to a QCL parameter used for QCL indication of the PDCCH of the CORESET associated with the monitored search space having the lowest CORESET-ID in the latest slot in which one or more CORESETs in the active BWP of the serving cell are monitored by the UE, may be replaced with the TCI state or the QCL assumption of the CORESET having the lowest CORESET-ID in the latest slot and associated with the monitored search space, may be replaced with the TCI state or the QCL assumption of the CORESET having the lowest CORESET-ID in a specific slot and associated with the monitored search space, may be replaced with the TCI state or the QCL assumption of a specific CORESET, may be replaced with the TCI state or the QCL assumption (for example, RS of QCL type D in TCI state or QCL assumption) of the DL transmission (alternatively, the DL channel that triggers the specific UL transmission, the DL channel that schedules the specific UL transmission, and the DL channel that schedules the DL channel corresponding to the specific UL transmission) corresponding to the specific UL transmission, or may be replaced with the RS related to a QCL parameter of the specific DL transmission (RS that is QCL with the specific DL transmission (for example, RS of QCL type D)).

The specific slot may be the latest slot in the PDSCH reception or the latest slot in the specific UL transmission. The specific CORESET may be a CORESET indicated by higher layer signaling (for example, the spatial relation information of the specific UL transmission).

The CORESET used for the default TCI state may include CORESET0 or may not include CORESET0.

The default spatial relation may be a spatial relation of the reference UL transmission.

The default spatial relation may be a PRACH resource used for latest PRACH transmission or the RS (RS resource index, SSB index, CSI-RS resource index) corresponding to a PRACH occasion.

When the specific UL transmission is the PUSCH of a certain cell, the specific DL transmission may be a PUCCH resource having the lowest ID in the active UL BWP of the cell, or may be a PUCCH resource group having the lowest ID in the active UL BWP of the cell.

When the specific UL transmission is the PUCCH, the specific DL transmission may be a PDCCH (PDCCH that schedules a PDSCH corresponding to HARQ-ACK carried by the PUCCH) corresponding to the PUCCH or a PDSCH corresponding to HARQ-ACK carried by the PUCCH. When the specific UL transmission is the PUSCH, the specific DL transmission may be a PDCCH that schedules the PUSCH, a PDCCH that schedules the PDSCH corresponding to HARQ-ACK carried by the PUSCH, or a PDSCH corresponding to HARQ-ACK carried by the PUSCH. When the specific UL transmission is the A-SRS, the specific DL transmission may be a PDCCH that triggers the A-SRS. When the specific UL transmission is the UL transmission triggered by the MAC CE, such as the SP-SRS, the specific DL transmission may be a PDCCH that schedules the MAC CE, or may be a PDSCH that carries the MAC CE.

For example, when the specific UL transmission is a PUCCH (or PUSCH) carrying HARQ-ACK, the specific DL transmission may be a PDCCH (PDCCH that schedules a PDSCH corresponding to the HARQ-ACK) indicating a resource of the PUCCH, or may be a PDSCH (used to generate the HARQ-ACK) corresponding to the HARQ-ACK.

The UE may determine the default spatial relation used for a certain slot.

The specific DL transmission may be the latest PDSCH.

The specific DL transmission may be configured in the UE by higher layer signaling, or may be specified by specifications.

The specific DL transmission may be a DL RS for pathloss measurement (for example, pathlossReferenceRS in SRS-ResourceSet in SRS-Config, PUCCH-PathlossReferenceRS in PUCCH-PowerControl in PUCCH-Config, and PUSCH-PathlossReferenceRS in PUSCH-PowerControl in PUSCH-Config). The DL RS for pathloss measurement may be a CSI-RS or an SSB.

When the DL RS for pathloss measurement is configured by higher layer signaling, the UE may use the configured DL RS for pathloss measurement as the default spatial relation. When the UE does not configure the DL RS for pathloss measurement by the higher layer signaling, the UE may determine the ID (RS resource index $q_d$) of the DL RS for pathloss measurement for PUSCH transmission and use the determined DL RS for pathloss measurement as the default spatial relation.

When the default spatial relation is the TCI state or the QCL assumpti2019P00165WO_F20200034_ DRAWINGS2019P00165WO_F20200034_DRAWINGSon, the DL RS for the spatial relation of the specific UL transmission and the DL RS for pathloss measurement for power control of the specific UL transmission may be different. By making the DL RS for the spatial relation of the specific UL transmission and the DL RS for pathloss measurement for power control of the specific UL transmission common, it is possible to appropriately perform power control of the specific UL transmission.

<<Time Offsets of DL and UL>>

When the UE is implicitly or explicitly configured to use the default spatial relation for the spatial relation of the specific UL transmission, when the time offset between reception of the DCI (for example, DCI for scheduling specific DL transmission) and reception of the specific DL transmission is equal to or greater than the threshold, the UE may assume that the spatial relation of the specific UL transmission (for example, RS of the spatial relation) is the same as the TCI state or QCL assumption (for example, RS of QCL type D in TCI state or QCL assumption) applied to the CORESET used for PDCCH transmission scheduling the specific DL transmission.

When the UE is implicitly or explicitly configured to use the default spatial relation for the spatial relation of the specific UL transmission, or when the UE is configured with a specific parameter by a specific higher layer parameter, when the time offset between reception of the DCI (for example, DCI for scheduling specific DL transmission) and reception of the specific DL transmission is less than the threshold, the UE may assume that the spatial relation of the specific UL transmission (for example, RS of the spatial relation) is the same as the default spatial relation.

When the TCI presence information (for example, higher layer parameter TCI-PresentInDCI) is not configured for the CORESET for scheduling the PDSCH or when the PDSCH is scheduled by the DCI format 1_0, when the time offset between reception of the DL DCI (for example, DCI for scheduling the PDSCH) and reception of the PDSCH corresponding to the DCI is equal to or greater than the threshold, the UE may assume that the spatial relation (for example, RS of spatial relation) of the PUCCH (or PUSCH) carrying the HARQ-ACK for the PDSCH is the same as the TCI state or the QCL assumption (for example, RS of QCL type D in TCI state or QCL assumption) applied to the CORESET used for the PDCCH transmission for scheduling the PDSCH.

Figure 3A:
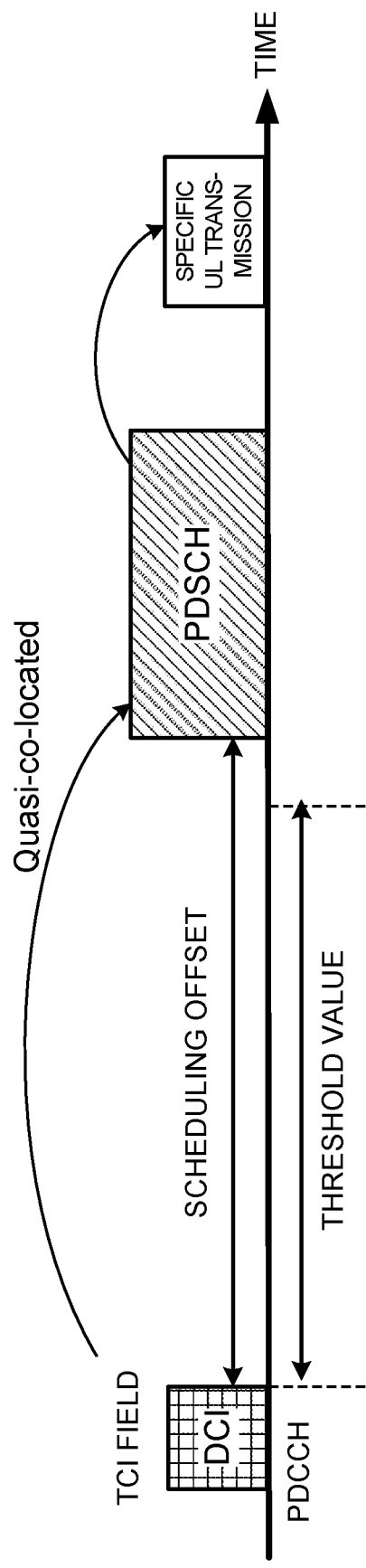
FIGS. 3A and 3B are diagrams illustrating examples of a QCL assumption of a PDSCH.

When the TCI presence information is set to "enabled", the TCI field in the DCI in the component carrier (CC) for scheduling (the PDSCH) indicates the activated TCI state in the scheduled CC or DL BWP, and when the PDSCH is scheduled by DCI format 1_1, the UE may use the TCI with the DCI and according to the value of the TCI field in the detected PDCCH to determine the spatial relation of the PUCCH (or PUSCH) carrying HARQ-ACK for the PDSCH. When the time offset between the reception of the DL DCI (scheduling the PDSCH) and the PDSCH corresponding to the DCI is equal to or greater than the threshold, the UE may assume that the spatial relation (for example, RS of the spatial relation) of the PUCCH (or PUSCH) carrying the HARQ-ACK for the PDSCH is QCL with the RS (for example, RS of QCL type D) in the TCI state with respect to the QCL type parameter given by the indicated TCI state (for example, FIG. 3A).

Figure 3B:
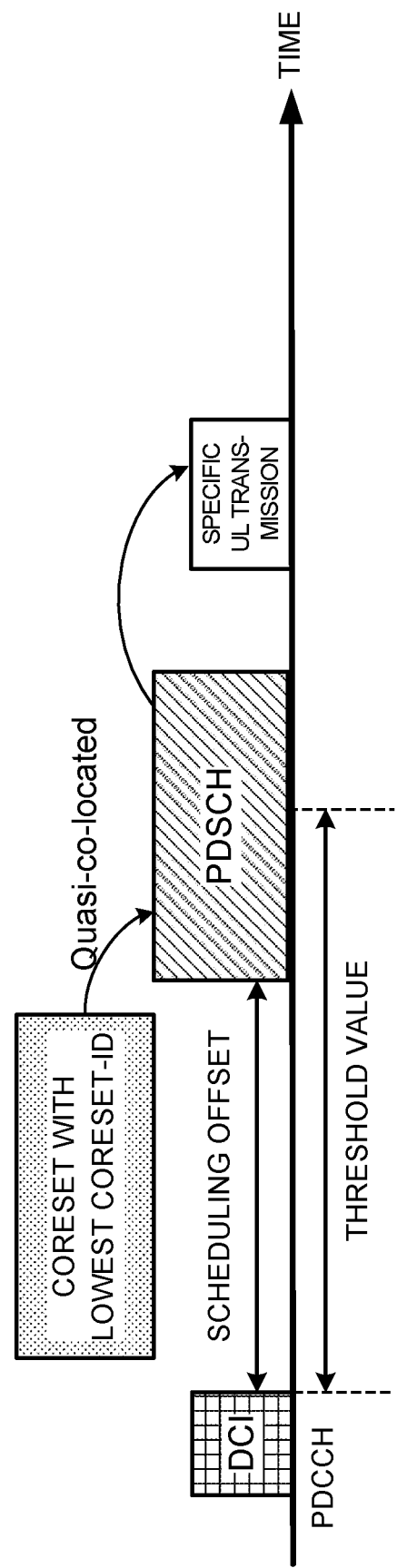

In both a case where the TCI presence information is set to "enabled" and a case where the TCI information in the DCI is not configured in the RRC connection mode, when the time offset between reception of DL DCI (DCI for scheduling the PDSCH) and the corresponding PDSCH (PDSCH scheduled by the DCI) is less than the threshold, the UE may assume that the spatial relation (for example, RS of spatial relation) of the PUCCH (or PUSCH) carrying the HARQ-ACK for the PDSCH is QCL with the RS related to a QCL parameter used for QCL indication of the PDCCH of the CORESET associated with a monitored search space and having the lowest CORESET-ID in a specific slot (for example, latest slot) in which one or more CORESETs in an active BWP of the serving cell are monitored by the UE (for example, FIG. 3B), or may assume that the spatial relation of the PUCCH (or PUSCH) carrying the HARQ-ACK for the PDSCH is QCL with the RS related to a QCL parameter of the PDSCH (RS (for example, RS of QCL type D) that is QCL with the PDSCH (DM-RS port of the PDSCH, the antenna port of the PDSCH)).

The specific slot may be the latest slot in the PDSCH (for example, the PDSCH corresponding to the HARQ-ACK carried by the specific UL transmission) corresponding to the specific UL transmission. In this case, by using the RS related to the QCL parameter associated with the CORESET of the latest slot for the PDSCH for the spatial relation of the specific UL transmission, the UE can make the beam (spatial domain reception filter) of the PDSCH and the beam (spatial domain transmission filter) of the specific UL transmission the same, avoid beam change processing, and suppress the processing load.

The specific slot may be the latest slot in the specific UL transmission. In this case, by using the RS related to the QCL parameter associated with the CORESET of the latest slot for the specific UL transmission for the spatial relation of the specific UL transmission, the UE can make the beam (spatial domain reception filter) of the latest PDCCH and the beam (spatial domain transmission filter) of the specific UL transmission the same, avoid beam change processing, and suppress the processing load.

<<Specific Example of Implicit or Explicit Configuration>>

A case where the UE is implicitly or explicitly configured to use the default spatial relation for the spatial relation of the specific UL transmission may be at least one of the following cases 1 to 5.

<<Case 1>>

Case 1 may be a case where there is no specific field in the specific higher layer parameter (for example, the RRC information element) (information of the specific field is not configured in the specific higher layer parameter).

The specific higher layer parameter may be SRS configuration information (SRS-Config), PUCCH configuration information (PUCCH-Config), or the like.

When there is no specific field in the SRS resource information (SRS-Resource) in the SRS configuration information (SRS-Config), the UE may assume that the spatial relation of the specific UL transmission is the same as the default spatial relation. The specific field may be spatial relation information (spatialRelationInfo) that is a configuration of the spatial relation between a reference RS (reference RS, for example, SSB, CSI-RS, or SRS) and a target SRS.

In FR2, the UE may assume that when an SRS resource in the SRS resource set whose usage is codebook based transmission or non-codebook based transmission does not include spatial relation information, the spatial relation with respect to the SRS resource is the same as the default spatial relation.

When it is indicated that the SRS resource set information (SRS-ResourceSet) in the SRS configuration information (SRS-Config) is used for codebook based transmission or non-codebook based transmission (the usage in the SRS resource set information indicates codebook based transmission (codebook) or non-codebook based transmission (non-Codebook)), and there is no specific field in the SRS resource information (SRS-Resource) indicating the SRS resource in the SRS resource set, the UE may assume that the RS of the spatial relation of the PUSCH is the same as the RS of QCL type D in the active TCI state of the specific DL transmission. The specific field may be spatial relation information (spatialRelationInfo).

If the usage in the SRS resource set information indicates codebook based transmission or non-codebook based transmission, and there is no specific field in SRS resource information (SRS-Resource) indicating the SRS resource in the SRS resource set, the UE may assume that the RS of the spatial relation of a PUSCH is the same as the RS of the QCL type D in the active TCI state of the specific DL transmission. The specific field may be spatial relation information (spatialRelationInfo).

When there is no specific field in the PUCCH configuration information (PUCCH-Config), the UE may assume that the RS of the spatial relation of the PUCCH is the same as the RS of QCL type D in the active TCI state of the specific DL transmission. The specific field may be an element of a list (spatialRelationInfoToAddModList). The element may be PUCCH spatial relation information (PUCCH-SpatialRelationInfo) used to configure a spatial setting for PUCCH transmission.

<<Case 2>>

Case 2 may be a case where the specific higher layer parameter is not configured.

The specific higher layer parameter may be a specific RRC information element or a higher layer parameter (for example, spatialRelationInfo, PUCCH-SpatialRelationInfo) of the spatial relation information.

The SRS parameter (a higher layer parameter (spatialRelationInfo) of the spatial relation information that is a configuration of the spatial relation between the reference RS and the target SRS) may be semi-statically configurable by a higher layer parameter (SRS-Resource) of the SRS resource.

In a case where the higher layer parameter spatialRelationInfo is configured, it may include the ID of the reference RS. The reference RS may be an SS/PBCH block, a CSI-RS, or an SRS. When there is a higher layer parameter (servingCellId) of the serving cell ID, the CSI-RS may be configured on the serving cell indicated thereby. The SRS may be configured on the UL BWP indicated by the higher layer parameter (uplinkBWP) of the UL BWP, may be configured on the serving cell indicated by the higher layer parameter (servingCellId) of the serving cell ID when such exists, or may be configured on the same serving cell as the target SRS when such does not exist.

When the higher layer parameter spatialRelationInfo is not configured, the UE may assume that the RS of the spatial relation is the same as the RS of QCL type D in the active TCI state of the specific DL transmission.

When the higher layer parameter spatialRelationInfo is not configured, the UE may assume that the RS of the spatial relation is the same as the RS of QCL type D in the active TCI state of the specific DL transmission or the RS of QCL type D in the TCI state or QCL assumption of the CORESET having the lowest CORESET-ID in the latest slot and associated with the monitored search space.

<<Case 3>>

The case 3 may be a case where the specific RS is not configured in the specific higher layer parameter (the specific higher layer parameter does not include the specific RS, and the specific higher layer parameter does not provide the specific RS).

The specific higher layer parameter may be SRS configuration information (SRS-Config), spatial relation information (spatialRelationInfo), PUCCH configuration information (PUCCH-Config), PUCCH spatial relation information (PUCCH-SpatialRelationInfo), or the like.

The specific RS may be any of an SRS, an SSB, and a CSI-RS. When the specific RS is not configured in the specific higher layer parameter, none of the SRS, the SSB, and the CSI-RS may be configured in the specific higher layer parameter.

When a specific RS is not configured in the SRS resource information (SRS-Resource) in the SRS configuration information (SRS-Config), the UE may assume that the RS of the spatial relation of the specific UL transmission is the same as the RS of QCL type D in the active TCI state of the specific DL transmission. The specific RS may be an RS (referenceSignal) in the spatial relation information (spatialRelationInfo).

In FR2, when an SRS resource set (or the SRS resource in the SRS resource set) whose usage is codebook based transmission or non-codebook based transmission does not include the specific RS, the UE may assume that the spatial relation with respect to the SRS resource set (or the SRS resource in the SRS resource set) is the same as the default spatial relation.

When it is indicated that the SRS resource set information (SRS-ResourceSet) in the SRS configuration information (SRS-Config) is used for codebook based transmission or non-codebook based transmission (the usage in the SRS resource set information indicates codebook based transmission or non-codebook based transmission), and the specific RS is not configured in the SRS resource information (SRS-Resource) indicating the SRS resource in the SRS resource set, the UE may assume that the RS of the spatial relation of the PUSCH is the same as the RS of QCL type D in the active TCI state of the specific DL transmission. The specific RS may be an RS (referenceSignal) in the spatial relation information (spatialRelationInfo).

When the specific RS is not configured in the PUCCH configuration information (PUCCH-Config), the UE may assume that the RS of the spatial relation of the PUCCH is the same as the RS of QCL type D in the active TCI state of the specific DL transmission. The specific RS may be an RS (referenceSignal) in the PUCCH spatial relation information (PUCCH-SpatialRelationInfo).

In a case where the PUCCH spatial relation information does not include the specific RS but includes information for PUCCH power control (for example, pucch-PathlossReferenceRS-Id, p0-PUCCH-Id, closedLoopIndex), the UE can perform PUCCH power control based on the PUCCH spatial relation information.

<<Case 4>>

Case 4 may be a case where the specific higher layer parameter for a specific type is not configured.

The specific type may be at least one of the P-SRS, the SP-SRS, and the A-SRS, or may be specified by a higher layer parameter (resourceType) of the resource type in the SRS resource information.

<<<P-SRS>>>

A case where the SRS resource information (SRS-Resource) indicates the P-SRS to the UE in which one or more SRS resource configurations are configured (a case where the higher layer parameter (resourceType) of the resource type in the SRS resource information indicates "periodic") will be described.

In a case where the UE is configured with the higher layer parameter spatialRelationInfo including the ID (ssb-Index) of a reference SS/PBCH block, the UE may transmit the target SRS resource having the same spatial domain transmission filter as that used to receive the reference SS/PBCH block. In a case where the UE is configured with the higher layer parameter spatialRelationInfo including the ID (csi-RS-Index) of a reference CSI-RS, the UE may transmit the target SRS resource having the same spatial domain transmission filter as that used to receive a reference periodic CSI-RS or a reference semi-persistent CSI-RS. In a case where the UE is configured with the higher layer parameter spatialRelationInfo including the ID (srs) of a reference SRS, the UE may transmit the target SRS resource having the same spatial domain transmission filter as that used to transmit a reference P-SRS.

When the higher layer parameter spatialRelationInfo is not configured, the UE may assume that the RS of the spatial relation of the specific UL transmission is the same as the RS of QCL type D in the active TCI state of the specific DL transmission.

When the higher layer parameter spatialRelationInfo is not configured, the UE may assume that the RS of the spatial relation of the specific UL transmission is the same as the RS of QCL type D in the TCI state or QCL assumption of the CORESET having the lowest CORESET-ID in the latest slot and associated with the monitored search space.

<<<SP-SRS>>>

A case where the SRS resource information (SRS-Resource) indicates the SP-SRS to the UE in which one or more SRS resource configurations are configured (a case where the higher layer parameter (resourceType) of the resource type in the SRS resource information indicates "semi-persistent") will be described.

When the UE receives an activation command for the SRS resource and when the HARQ-ACK corresponding to the PDSCH carrying a selection command is transmitted in a slot n, the corresponding operation and the UE's assumption on the SRS transmission corresponding to the configured SRS resource set may be applied from a slot n+3N+1 (where N is the number of slots in the subframe). The activation command may include a spatial relation assumption provided by a list of references to one reference signal ID per element of the activated SRS resource set. Each ID in the list may refer to a reference SS/PBCH block, NZP CSI-RS resource, or SRS resource. The reference NZP CSI-RS resource may be an NZP CSI-RS resource configured on the serving cell indicated by a resource serving cell ID field if such exists in the activation command, or may be an NZP CSI-RS resource configured on the same serving cell as the SRS resource set if such does not exist. The reference SRS resource may be an SRS resource configured on the serving cell and the UL BWP indicated by a resource serving cell ID and a resource BWP ID if such exist in the activation command, or may be an SRS resource configured on the same serving cell and the BWP as the SRS resource set if such do not exist.

In a case where the UE is configured with the higher layer parameter spatialRelationInfo including the ID (ssb-Index) of a reference SS/PBCH block, the UE may transmit the target SRS resource having the same spatial domain transmission filter as that used to receive the reference SS/PBCH block. In a case where the UE is configured with the higher layer parameter spatialRelationInfo including the ID (csi-RS-Index) of a reference CSI-RS, the UE may transmit the target SRS resource having the same spatial domain transmission filter as that used to receive a reference periodic CSI-RS or a reference semi-persistent CSI-RS. In a case where the UE is configured with the higher layer parameter spatialRelationInfo including the ID (srs) of a reference SRS, the UE may transmit the target SRS resource having the same spatial domain transmission filter as that used to transmit a reference SP-SRS or a reference SP-SRS.

When no higher layer parameter spatialRelationInfo is configured or when no higher layer parameter spatialRelationInfo is activated, the UE may assume that the RS of the spatial relation of the specific UL transmission is the same as the RS of QCL type D in the active TCI state of the specific DL transmission.

When no higher layer parameter spatialRelationInfo is configured or no higher layer parameter spatialRelationInfo is activated, the UE may assume that the RS of the spatial relation of the specific UL transmission is the same as the RS of QCL type D in the TCI state or QCL assumption of the CORESET having the lowest CORESET-ID in the latest slot and associated with the monitored search space.

<<<A-SRS>>>

A case where the SRS resource information (SRS-Resource) indicates the A-SRS to the UE in which one or more SRS resource configurations are configured (a case where the higher layer parameter (resourceType) of the resource type in the SRS resource information indicates "aperiodic") will be described.

In a case where the UE is configured with the higher layer parameter spatialRelationInfo including the ID (ssb-Index) of a reference SS/PBCH block, the UE may transmit the target SRS resource having the same spatial domain transmission filter as that used to receive the reference SS/PBCH block. In a case where the UE is configured with the higher layer parameter spatialRelationInfo including the ID (csi-RS-Index) of the reference CSI-RS, the UE may transmit the target SRS resource having the same spatial domain transmission filter as that used to receive a reference periodic (P)-CSI-RS, a reference semi-persistent (SP)-CSI-RS, or the latest reference aperiodic (A)-CSI-RS. In a case where the UE is configured with the higher layer parameter spatialRelationInfo including the ID (srs) of a reference SRS, the UE may transmit the target SRS resource having the same spatial domain transmission filter as that used to transmit a reference P-SRS, a reference SP-SRS, or a reference A-SRS.

When the higher layer parameter spatialRelationInfo is not configured, the UE may assume that the RS of the spatial relation of the specific UL transmission is the same as the RS of QCL type D in the active TCI state of the specific DL transmission.

When the higher layer parameter spatialRelationInfo is not configured, the UE may assume that the RS of the spatial relation of the specific UL transmission is the same as the RS of QCL type D in the TCI state or QCL assumption of the CORESET having the lowest CORESET-ID in the latest slot and associated with the monitored search space.

When the higher layer parameter spatialRelationInfo is not configured, the UE may assume that the RS of the spatial relation of the specific UL transmission is the same as the RS of QCL type D in the TCI state or QCL assumption of the PDCCH that triggers the A-SRS.

<<Case 5>>

Case 5 may be a case where the SRS resource or the SRS resource set for the PUSCH or the SRS does not provide the RS of the spatial relation.

This SRS resource set may be an SRS resource set with usage that is not beam management (beamManagement) (is codebook based transmission (codebook), non-codebook based transmission (nonCodebook), or antenna switching (antennaSwitching)).

Case 5 may be a case where the SRS resource indicated by the SRI field in the DCI format 0_1 for scheduling the PUSCH does not provide the RS of the spatial relation.

The case where the SRS resource does not provide the RS of the spatial relation may be a case where the spatial relation information (for example, spatialRelationInfo and SRS-SpatialRelationInfo) is not provided by the SRS resource (for example, SRS-Resource), a case where the reference signal (for example, referenceSignal, ssb-Index, csi-RS-Index, srs) is not provided by the spatial relation information in the SRS resource, or a case where it is configured by the SRS resource that the spatial relation is the default spatial relation (RS of the default spatial relation).

For example, it is assumed that the SRS resource set includes SRS resources #0 and #1, the SRS resource #0 does not include the spatial relation information, and the SRS resource #1 includes the spatial relation information. When the SRS resource #0 is indicated by the SRI field in the DCI format 0_1 for scheduling the PUSCH, the UE may use the default spatial relation for the spatial relation of the PUSCH. When the SRS resource #1 is indicated by the SRI field in the DCI format 0_1 for scheduling the PUSCH, the UE may use the spatial relation information of the SRS resource #1 for the spatial relation of the PUSCH.

For example, it is assumed that the SRS resource set includes one SRS resource #0 and the SRS resource #0 does not include the spatial relation information. The UE may use the default spatial relation for the spatial relation of the PUSCH.

In this case, the DCI (DCI format 0_1, 0_0) for scheduling the PUSCH may not include the SRI field (may be a DCI format 0_0, or may be a DCI format 0_1 in which the size of the SRI field is 0 bits).

Case 5 may be a case where at least one SRS resource in the SRS resource set does not provide the RS of the spatial relation.

When the SRS resource or the SRS resource set for the PUSCH or the SRS does not provide the RS of the spatial relation, the UE may assume that the spatial relation with respect to the SRS resource or the SRS resource set is the same as the default spatial relation. In FR2, when the SRS resource or the SRS resource set for the PUSCH or the SRS does not provide the RS of the spatial relation, the UE may assume that the spatial relation with respect to the SRS resource or the SRS resource set is the same as the default spatial relation.

Case 5 may be a case where an indicated SRS resource in an SRS resource set with usage that is not beam management (beamManagement) (is codebook based transmission (codebook), non-codebook based transmission (nonCodebook), or antenna switching (antennaSwitching)) does not provide the RS of the spatial relation, or may be a case where at least one SRS resource in an SRS resource set with usage that is not beam management does not provide the RS of the spatial relation. In this case, the UE may assume that the spatial relation of all the SRS resources in the SRS resource set is the same as the default spatial relation. In this case, the size of the SRI field in the DCI format 0_1 for scheduling the PUSCH may be $\log_2$ (the number of SRS resources in the SRS resource set) bits, 0 bits, or $\log_2$ (the number of SRS resources in which the RS of the spatial relation is configured in the SRS resource set) bits.

<<Case 6>>

Case 6 may be a case where a specific parameter (information regarding the TCI state or the QCL assumption) is configured by the specific higher layer parameter (case where the specific higher layer parameter indicates the specific parameter, or the specific higher layer parameter includes a field of the specific parameter).

The specific higher layer parameter may be SRS configuration information (SRS-Config), PUCCH configuration information (PUCCH-Config), spatial relation information (for example, spatialRelationInfo, PUCCH-SpatialRelationInfo), reference signal information (referenceSignal) in the spatial relation information, a type in the spatial relation information, or the like. In addition, the specific parameter may be one of options of the reference signal information or type.

The specific parameter may be a parameter (for example, a TCI state) indicating that the TCI state of the specific DL transmission is used for the spatial relation of the specific UL transmission, a parameter (for example, default) indicating that the RS of the spatial relation of the specific UL transmission is the default spatial relation, a parameter (for example, CORESET) indicating that the spatial relation of the specific UL transmission is the same as the TCI state of the CORESET, or a parameter (for example, ControlRS) indicating that the RS of the spatial relation of the specific UL transmission is the same as the RS of QCL type D in the TCI state of the specific DL transmission.

For example, when a CORESET is configured by the spatial relation information (when the spatial relation information indicates the CORESET, when the spatial relation information includes a field of the CORESET), the UE may assume that the RS of the spatial relation of the specific UL transmission is the same as the RS of QCL type D in the TCI state of the specific DL transmission.

When a specific parameter is configured by the SRS resource information (SRS-Resource) in the SRS configuration information (SRS-Config), the UE may assume that the RS of the spatial relation of the specific UL transmission is the same as the RS of QCL type D in the active TCI state of the specific DL transmission.

In FR2, when an SRS resource set (or an SRS resource in the SRS resource set) whose usage is codebook based transmission or non-codebook based transmission includes the specific parameter, the UE may assume that the spatial relation with respect to the SRS resource set (or the SRS resource in the SRS resource set) is the same as the default spatial relation.

When it is indicated that the SRS resource set information (SRS-ResourceSet) in the SRS configuration information (SRS-Config) is used for codebook based transmission or non-codebook based transmission (the usage in the SRS resource set information indicates codebook based transmission or non-codebook based transmission), and a specific parameter is configured by the SRS resource information (SRS-Resource) (or spatial relation information (spatialRelationInfo)) indicating the SRS resource in the SRS resource set, the UE may assume that the RS of the spatial relation of the PUSCH is the same as the RS of QCL type D in the active TCI state of the specific DL transmission.

When a specific parameter is configured by the PUCCH configuration information (PUCCH-Config), the UE may assume that the RS of the spatial relation of the PUCCH is the same as the RS of QCL type D in the active TCI state of the specific DL transmission. The specific parameter may be in an element of the list (spatialRelationInfoToAddModList). The element may be PUCCH spatial relation information (PUCCH-SpatialRelationInfo) used to configure a spatial setting for PUCCH transmission.

When a CORESET is configured by the PUCCH configuration information (PUCCH-Config), the UE may assume that the RS of the spatial relation of the PUCCH is the same as the RS of QCL type D in the TCI state of the CORESET.

<<Effects>>

According to Embodiment 1 described above, when the active TCI state of the specific DL transmission is updated by the MAC CE or the DCI, the spatial relation of the specific UL transmission can be updated. Since there is no need to perform RRC reconfiguration and the spatial relation of the specific UL transmission can be quickly controlled, the communication characteristics of the specific UL transmission can be enhanced. In addition, since the base station does not require configuration and activation of the spatial relation information, signaling overheads for the spatial relation and communication interruption can be avoided.

In the UE capability information, it has been studied that the maximum number of the sum of active spatial relations for each CC and each BWP, which are (aperiodic NZP CSI-RS) unique DL-RS, SRS without spatial relation configuration, and TCI states available for DCI triggering of aperiodic NZP CSI-RS, for indicating a spatial domain transmission filter for the SRS for PUCCH and PUSCH, is at least one. Furthermore, it has been studied to support one additional active spatial relation for the PUCCH when the maximum number of active spatial relations is 1. According to Embodiment 1, the sum of active spatial relations can be kept at 1, and the UE can operate along this UE capability information.

Embodiment 2

The UE may compare the time offset related to the specific UL transmission with a threshold. The UE may determine the spatial relation of the specific UL transmission based on of a result of the comparison.

The time offset may be a time between a timing related to the specific UL transmission and the specific UL transmission.

The threshold may be replaced with a time length for QCL (timeDulationForQCL), a time offset threshold, a threshold for offset between a DCI indicating a TCI state and a PDSCH scheduled by the DCI, a scheduling offset threshold (Threshold-Sched-Offset), or the like.

The threshold may be configured (notified) to the UE by higher layer signaling, may be reported from the UE by the UE capability information, may be the same as a threshold for a time offset for the TCI state of the PDSCH or the A-CSI-RS, or may be specified by the specifications. Different thresholds depending on subcarrier spacing (SCS) may be set or notified or reported or defined.

The threshold may be represented by the number of symbols or time (for example, milliseconds (ms)).

The UE may apply the default spatial relation to the specific UL transmission based on a result of comparison between the time offset and the threshold. The default spatial relation may be the default spatial relation in Embodiment 1. The conditions for applying the default spatial relation may include a condition for applying the default spatial relation in Embodiment 1.

The UE may use one of the following time offsets 1 to 3 for the specific UL transmission.

<<Time Offset 1>>

The time offset may be a time between reception of DCI (PDCCH) related to the specific UL transmission and the specific UL transmission.

Figure 4A:
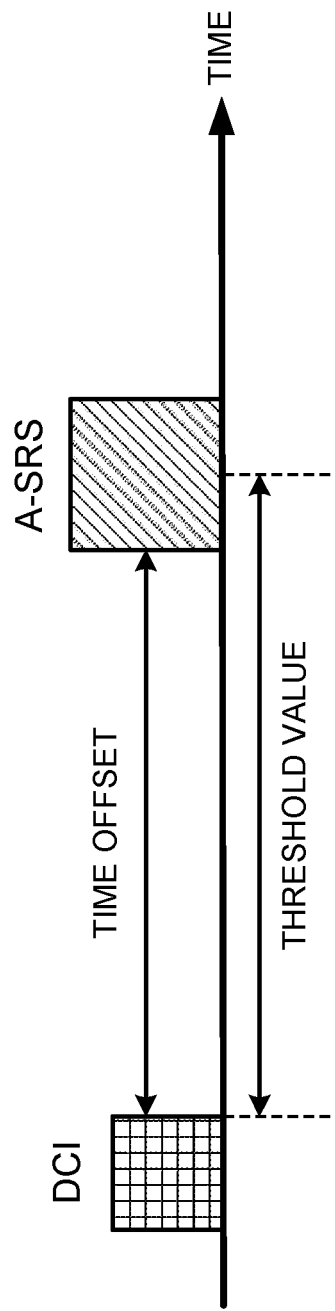
FIGS. 4A and 4B are diagrams illustrating an example of a time offset 1.

When the specific UL transmission is the A-SRS, the time offset may be the time between reception of the DCI triggering the A-SRS and transmission of the A-SRS (FIG. 4A).

Figure 4B:
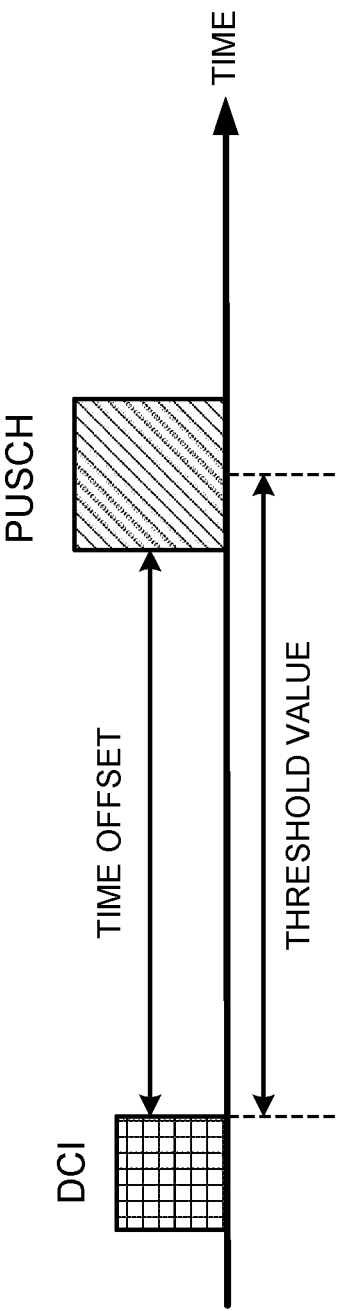

When the specific UL transmission is the PUSCH, the time offset may be a time between reception of DCI for scheduling the PUSCH and transmission of the PUSCH (FIG. 4B). The UE may use this time offset when referring to the spatial relation of the A-SRS indicated by the SRI in the DCI.

When the specific UL transmission is the PUSCH, the time offset may be a time between reception of the DCI that triggers the A-SRS and transmission of the PUSCH in which the spatial relation of the A-SRS is specified by the SRI in the DCI for scheduling the PUSCH (FIG. 4B).

When the specific UL transmission is the PUCCH, the time offset may be a time between reception of DCI (for example, DCI indicating a resource of the PUCCH or DCI for scheduling a PDSCH corresponding to HARQ-ACK carried by the PUCCH) corresponding to the PUCCH and transmission of the PUCCH.

<<Time Offset 2>>

The time offset may be a time between a MAC CE (activation MAC CE, activation/deactivation MAC CE) for activation of the spatial relation information and the specific UL transmission.

The spatial relation information of the SRS may be updated (activated) or the spatial relation information of the PUCCH may be updated (activated) by the activation MAC CE. The SRS may be at least one of A-SRS, SP-SRS, and P-SRS.

The time offset may be a time between the activation MAC CE and the specific UL transmission, or may be a time between the activation MAC CE and the specific UL transmission using the spatial relation information switched thereby. The threshold may be a time required from the activation MAC CE of the spatial relation information to switching of the spatial relation information (beam).

Figure 5A:
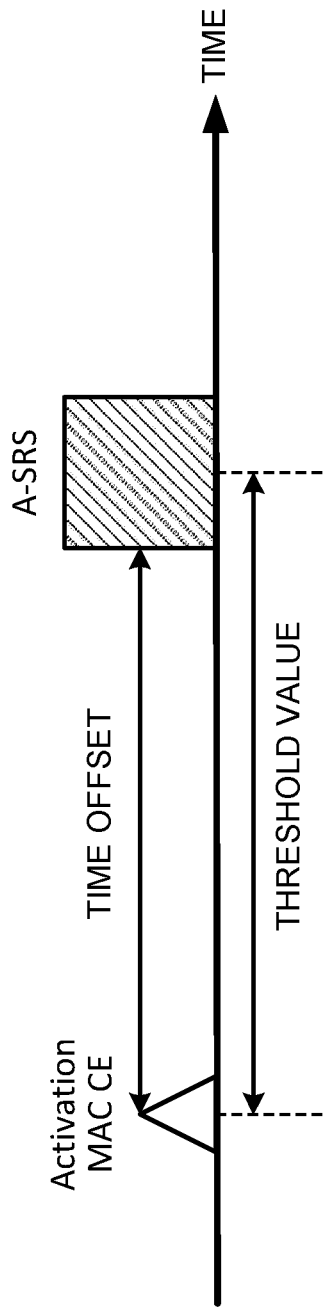
FIGS. 5A and 5B are diagrams illustrating an example of a time offset 2.

When the specific UL transmission is the SRS, the time offset may be a time between reception of the activation MAC CE of the spatial relation information of the SRS and transmission of the SRS (FIG. 5A).

Figure 5B:
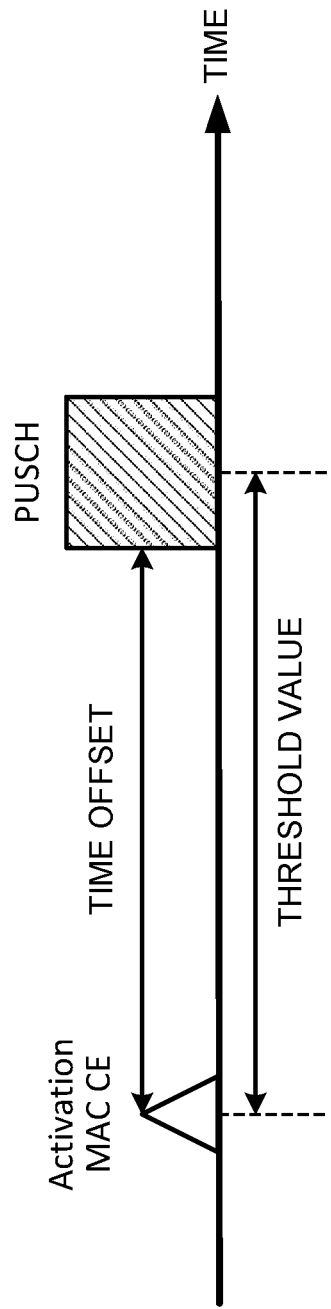

When the specific UL transmission is the PUSCH, the time offset may be a time between reception of the activation MAC CE of the spatial relation information of the SRS and transmission of the PUSCH (FIG. 5B). When the spatial relation information of the SRS indicated by the SRI in the DCI for scheduling the PUSCH is activated by the activation MAC CE, the UE may use this time offset.

When the specific UL transmission is the PUCCH, the time offset may be a time between reception of the activation MAC CE of the spatial relation information of the PUCCH and transmission of the PUCCH.

<<Time Offset 3>>

The time offset may be a time between the update of the TCI state used for the default spatial relation and the specific UL transmission.

For example, the TCI state used for the default spatial relation may be the TCI state for the PDCCH, or may be the TCI state for QCL assumption of the PDSCH. The update of the TCI state may be the reception of the DCI (TCI field) indicating the TCI state of the PDCCH, may be the reception of a MAC CE (activation MAC CE) indicating the TCI state of the PDCCH or activating the TCI state of the PDSCH, or may be the update of the TCI state corresponding to the default spatial relation. For example, when the default spatial relation is the TCI state or QCL assumption of the CORESET having the lowest CORESET-ID in the most recent slot and associated with the monitored search space, the default spatial relation may be updated in response to a change in the most recent slot.

The specific UL transmission may be at least one of the SRS, the PUSCH, and the PUCCH. The SRS may be at least one of A-SRS, SP-SRS, and P-SRS.

When the specific UL transmission is the SRS, the time offset may be a time between the update of the TCI state (for example, reception of an update indication and a slot boundary where the update has occurred) and the transmission of the SRS (FIG. 6A).

When the specific UL transmission is the PUSCH, the time offset may be a time between the update of the TCI state (for example, reception of an update indication and a slot boundary where the update has occurred) and the transmission of the PUSCH (FIG. 6B). When the TCI state used for the default spatial relation of the SRS indicated by the SRI in the DCI for scheduling the PUSCH is updated, the UE may determine the time offset by a threshold.

When the specific UL transmission is the PUCCH, the time offset may be a time between the update of the TCI state (for example, reception of an update indication and a slot boundary where the update has occurred) and the transmission of the PUCCH.

<<Effects>>

According to Embodiment 2 described above, the spatial relation of the specific UL transmission can be appropriately determined by using the time offset related to the specific UL transmission.

Embodiment 3

The spatial relation (spatial domain transmission filter) of the specific UL transmission may be different depending on whether the time offset of Embodiment 2 is less than the threshold or equal to or greater than the threshold. The UE may assume that the spatial relation (spatial domain transmission filter) of the specific UL transmission varies depending on whether the time offset is less than the threshold or equal to or greater than the threshold. Whether the time offset is less than the threshold or equal to or greater than the threshold may be replaced with whether the time offset is equal to or less than the threshold or greater than the threshold.

When the time offset is less than the threshold, the UE may apply the default spatial relation to the specific UL transmission. When the time offset is equal to or greater than the threshold, the UE may apply the indicated spatial relation information to the specific UL transmission. This spatial relation information may be indicated (activated, configured) by at least one of DCI, MAC CE, and RRC signaling.

The UE may apply the default spatial relation to the specific UL transmission based on a result of comparison between the time offset and the threshold. The default spatial relation may be the default spatial relation in Embodiment 1. The conditions for applying the default spatial relation may include a condition for applying the default spatial relation in Embodiment 1.

When the usage of the SRS resource set used for the spatial relation of the specific UL transmission is specific usage and the time offset is less than the threshold, the UE may apply the default spatial relation to the specific UL transmission. Otherwise, the UE may apply the indicated spatial relation information to the specific UL transmission. The specific usage may be at least one of beam management (beamManagement), codebook based transmission (codebook), non-codebook based transmission (nonCodebook), or antenna switching (antennaSwitching), or may be the beam management, the codebook based transmission, and the non-codebook based transmission, or may be antenna switching, or may be codebook based transmission and non-codebook based transmission.

Figure 7A:
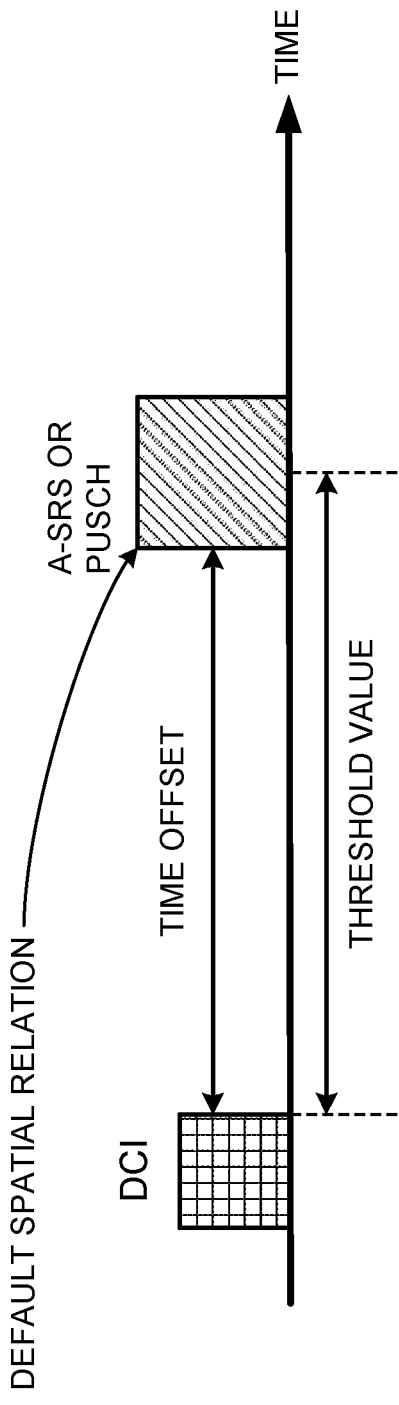
FIGS. 7A and 7B are diagrams illustrating an example of determination of a spatial relation based on a time offset.

As illustrated in FIG. 7A, when the time offset is a time between the reception of the DCI and the specific UL transmission (for example, SRS or PUSCH) triggered or scheduled by the DCI, and the time offset is less than the threshold, the UE may apply the default spatial relation to the specific UL transmission.

Figure 7B:
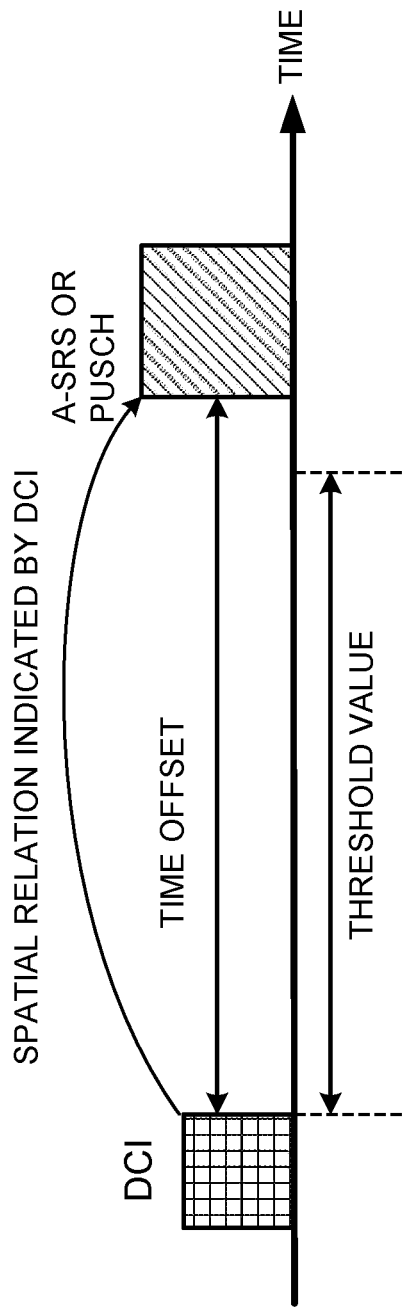

As illustrated in FIG. 7B, when the time offset is a time between the reception of the DCI and the specific UL transmission (for example, SRS or PUSCH) triggered or scheduled by the DCI, and the time offset is equal to or greater than the threshold, the UE may apply the indicated spatial relation information to the specific UL transmission.

<<Effects>>

According to Embodiment 3, for example, in a case where the indicated spatial relation information is applicable to the specific UL transmission, the spatial relation information is applied to the specific UL transmission, and in a case where the indicated spatial relation information is not applicable to the specific UL transmission, the default spatial relation is applied to the specific UL transmission, so that the spatial relation appropriate for the specific UL transmission can be used.

Embodiment 4

The UE may assume that a spatial relation of an SRS resource set (associated with specific usage) having specific usage is an exception. The specific usage may be beam management (beamManagement (BM)). The UE may apply at least one of Embodiments 2 and 3 when using an SRS resource set with usage other than beam management, and apply this Embodiment 4 when using an SRS resource set with usage of beam management.

The SRS resource set having the usage of beam management is used for SRS-based UL beam management (SRS based UL beam management, UL beam sweep), and thus the spatial relation information does not need to be configured in the SRS resource in the SRS resource set. The UE may determine (may sweep) UL beams for SRS-based UL beam management without using the spatial relation information.

The UE may apply the default spatial relation to the specific UL transmission based on the SRS resource in the SRS resource set with the usage of beam management under specific conditions. The default spatial relation may be the default spatial relation in Embodiment 1. The conditions for applying the default spatial relation may include a condition for applying the default spatial relation in Embodiment 1.

When the specific UL transmission is the A-SRS, the UE may determine the spatial relation of the A-SRS by using any one of the time offsets 1, 2, and 3 in Embodiment 2.

When the specific UL transmission is the SRS (SP-SRS or P-SRS) other than the A-SRS, the UE may determine the spatial relation of the SRS using one of the time offsets 1 and 2 of Embodiment 2.

The UE may determine the spatial relation according to any one of the following methods 1 and 2 for determining the spatial relation.

<<Method 1 for Determining Spatial Relation>>

In FR2, when the spatial relation information is not configured on the SRS resource in the SRS resource set with the usage of beam management (the RS of the spatial relation information is not configured), when the time offset is less than the threshold, the UE may determine the spatial relation information of the specific UL transmission depending on the UE implementation, or when the time offset is equal to or greater than the threshold, the UE may apply the default spatial relation to the spatial relation of the specific UL transmission.

In FR2, when the SRS resource in the SRS resource set with the usage of beam management is used for the A-SRS, and spatial relation information is not configured on the SRS resource (the RS of the spatial relation information is not configured), when a time offset is less than the threshold (FIG. 8A), the UE may determine the spatial relation information of the specific UL transmission depending on UE implementation, or when the time offset is equal to or greater than the threshold (FIG. 8B), the UE may apply the default spatial relation to the spatial relation of the specific UL transmission. The time offset may be a time between reception of DCI (indicating beam switching) that triggers the A-SRS and transmission of the A-SRS.

In FR2, when the SRS resource in the SRS resource set with the usage of beam management is used for the A-SRS, and the spatial relation information is not configured in the SRS resource (the RS of the spatial relation information is not configured), when a time offset is less than the threshold, the UE may determine the spatial relation information of the specific UL transmission depending on UE implementation, or when the time offset is equal to or greater than the threshold, the UE may apply the default spatial relation to the spatial relation of the symbol (for example, the first symbol or the last symbol) that satisfies the given condition among the plurality of SRS symbols, and determine the spatial relation of remaining symbols depending on the UE implementation. Consequently, the UE can sweep a beam corresponding to beam correspondence and a beam using another spatial relation in the plurality of SRS symbols.

<<Method 2 for Determining Spatial Relation>>

In FR2, when the spatial relation information is not configured on the SRS resource in the SRS resource set with the usage of beam management (the RS of the spatial relation information is not configured), when the time offset is less than the threshold, the UE may apply the default spatial relation to the spatial relation of the specific UL transmission, or when the time offset is equal to or greater than the threshold, the UE may determine the spatial relation information of the specific UL transmission depending on the UE implementation.

In FR2, when the SRS resource in the SRS resource set with the usage of beam management is used for the A-SRS, and the spatial relation information is not configured on the SRS resource (the RS of the spatial relation information is not configured), when the time offset is less than the threshold (FIG. 9A), the UE may apply the default spatial relation to the spatial relation of the specific UL transmission, or when the time offset is equal to or greater than the threshold (FIG. 9B), the UE may determine the spatial relation information of the specific UL transmission depending on the UE implementation. The time offset may be a time between reception of DCI (indicating beam switching) that triggers the A-SRS and transmission of the A-SRS.

In FR2, when the SRS resource in the SRS resource set with the usage of beam management is used for the A-SRS, and the spatial relation information is not configured in the SRS resource (the RS of the spatial relation information is not configured), when the time offset is less than the threshold, the UE may apply the default spatial relation to the spatial relation of the specific UL transmission, or when the time offset is equal to or greater than the threshold, the UE may apply the default spatial relation to the spatial relation of the symbol (for example, the first symbol or the last symbol) that satisfies the given condition among the plurality of SRS symbols, and determine the spatial relation of remaining symbols depending on the UE implementation. Consequently, the UE can sweep a beam corresponding to beam correspondence and a beam using another spatial relation in the plurality of SRS symbols.

<<Effects>>

According to Embodiment 4 described above, by applying the default spatial relation to the SRS resource in the SRS resource set having the usage of beam management under specific conditions, accuracy of the SRS-based beam management and beam sweeping can be improved as compared with a case where the spatial relation depends on UE implementation.

(Radio Communication System)

Hereinafter, a configuration of a radio communication system according to one embodiment of the present disclosure will be described. In this radio communication system, communication is performed using any one of the radio communication methods according to the embodiments of the present disclosure or a combination thereof.

Figure 10:
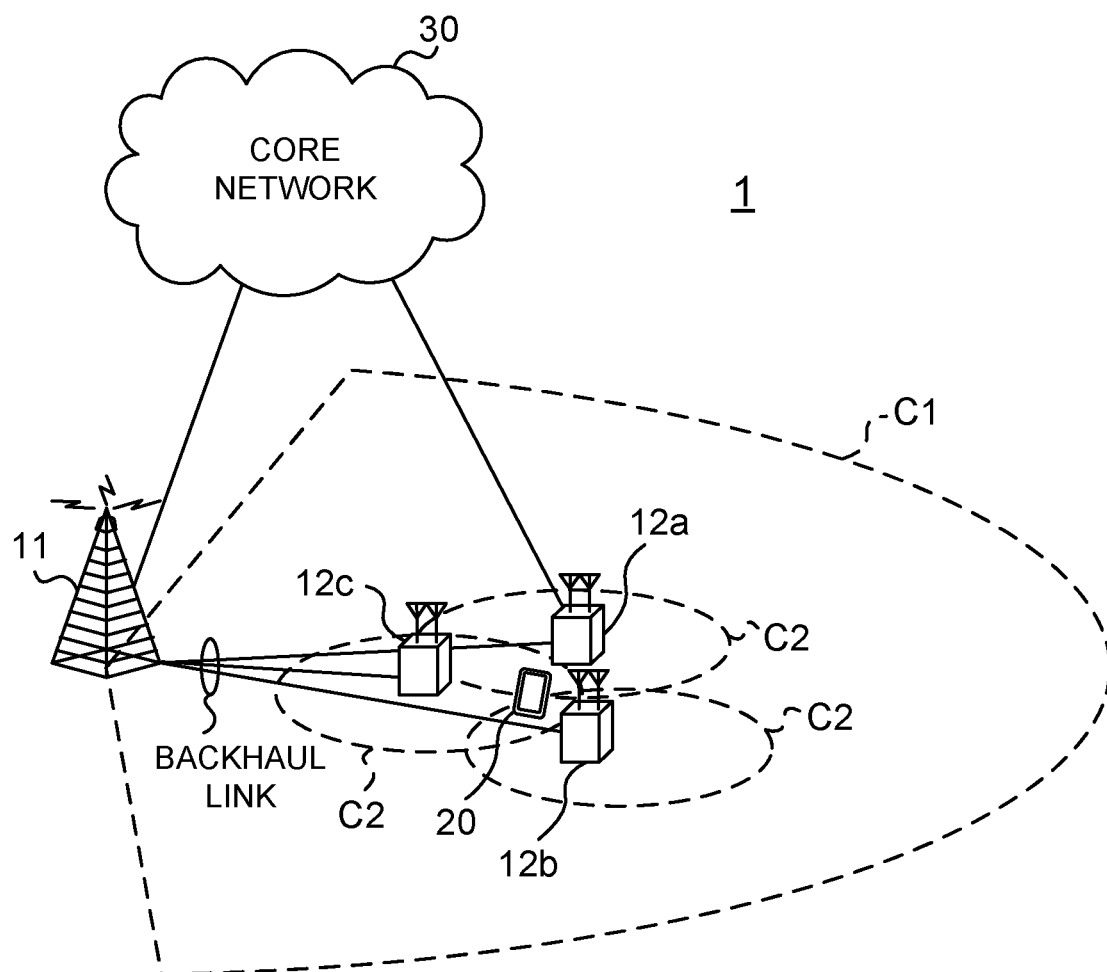
FIG. 10 is a diagram illustrating an example of a schematic configuration of a radio communication system according to one embodiment.

FIG. 10 is a diagram illustrating an example of a schematic configuration of the radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a master node (MN), and an NR base station (gNB) is a secondary node (SN). In NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNBs) (NR-NR dual connectivity (NN-DC)).

The radio communication system 1 may include a base station 11 that forms a macro cell C1 with a relatively wide coverage, and base stations 12 (12a to 12c) that are arranged in the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as base stations 10 unless specified otherwise.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range 1 (FR1) and a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of FR1 and FR2 are not limited to these, and for example, FR1 may be a frequency range higher than FR2.

Further, the user terminal 20 may perform communication on each CC using at least one of time division duplex (TDD) or frequency division duplex (FDD).

The plurality of base stations 10 may be connected by wire (for example, an optical fiber or an X2 interface in compliance with common public radio interface (CPRI)) or by radio (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

A base station 10 may be connected to a core network 30 via another base station 10 or directly. The core network 30 may include, for example, at least one of evolved packet core (EPC), 5G core network (5GCN), next generation core (NGC), and the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that, in the radio communication system 1, another radio access method (for example, another single carrier transmission method and another multi-carrier transmission method) may be used as UL and DL radio access methods.

In the radio communication system 1, as a downlink channel, a physical downlink shared channel (PDSCH) shared by each user terminal 20, a physical broadcast channel (PBCH), a physical downlink control channel (PDCCH), or the like may be used.

In the radio communication system 1, an uplink shared channel (physical uplink shared channel (PUSCH)) shared by each user terminal 20, an uplink control channel (physical uplink control channel (PUCCH)), a random access channel (physical random access channel (PRACH)), and the like may be used as uplink channels.

User data, higher layer control information, and a system information block (SIB) and the like are transmitted by the PDSCH. The PUSCH may transmit user data, higher layer control information, and the like. Further, the PBCH may transmit a master information block (MIB).

Lower layer control information may be transmitted by PDCCH. The lower layer control information may include, for example, downlink control information (DCI) including scheduling information of at least one of the PDSCH and the PUSCH.

Note that, the DCI for scheduling the PDSCH may be referred to as DL assignment, DL DCI, and the like, and the DCI for scheduling the PUSCH may be referred to as UL grant, UL DCI, and the like. Note that PDSCH may be replaced with DL data, and PUSCH may be replaced with UL data.

A control resource set (CORESET) and a search space may be used to detect the PDCCH. The CORESET corresponds to a resource that searches for DCI. The search space corresponds to a search area and a search method for PDCCH candidates. One CORESET may be associated with one or a plurality of search spaces. The UE may monitor CORESET associated with a certain search space based on search space configuration.

One search space may correspond to a PDCCH candidate corresponding to one or more aggregation levels. One or a plurality of search spaces may be referred to as a search space set. Note that "search space", "search space set", "search space configuration", "search space set configuration", "CORESET", "CORESET configuration", and the like in the present disclosure may be replaced with each other.

Uplink control information (UCI) including at least one of channel state information (CSI), delivery confirmation information (which may be referred to as, for example, hybrid automatic repeat request acknowledgement (HARQ-ACK), ACK/NACK, or the like), scheduling request (SR), or the like may be transmitted on the PUCCH. A random access preamble for establishing a connection with a cell may be transmitted on PRACH.

Note that in the present disclosure, downlink, uplink, and the like may be expressed without "link". Furthermore, various channels may be expressed without "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as the DL-RS.

The synchronization signal may be at least one of, for example, a primary synchronization signal (PSS) and a secondary synchronization signal (SSS). A signal block including SS (PSS or SSS) and PBCH (and DMRS for PBCH) may be referred to as an SS/PBCH block, an SS Block (SSB), and the like. Note that the SS, the SSB, or the like may also be referred to as a reference signal.

In the radio communication system 1, a sounding reference signal (SRS), a demodulation reference signal (DMRS), and the like may be transmitted as an uplink reference signal (UL-RS). Note that, DMRSs may be referred to as "user terminal-specific reference signals (UE-specific Reference Signals)".

(Base Station)

Figure 11:
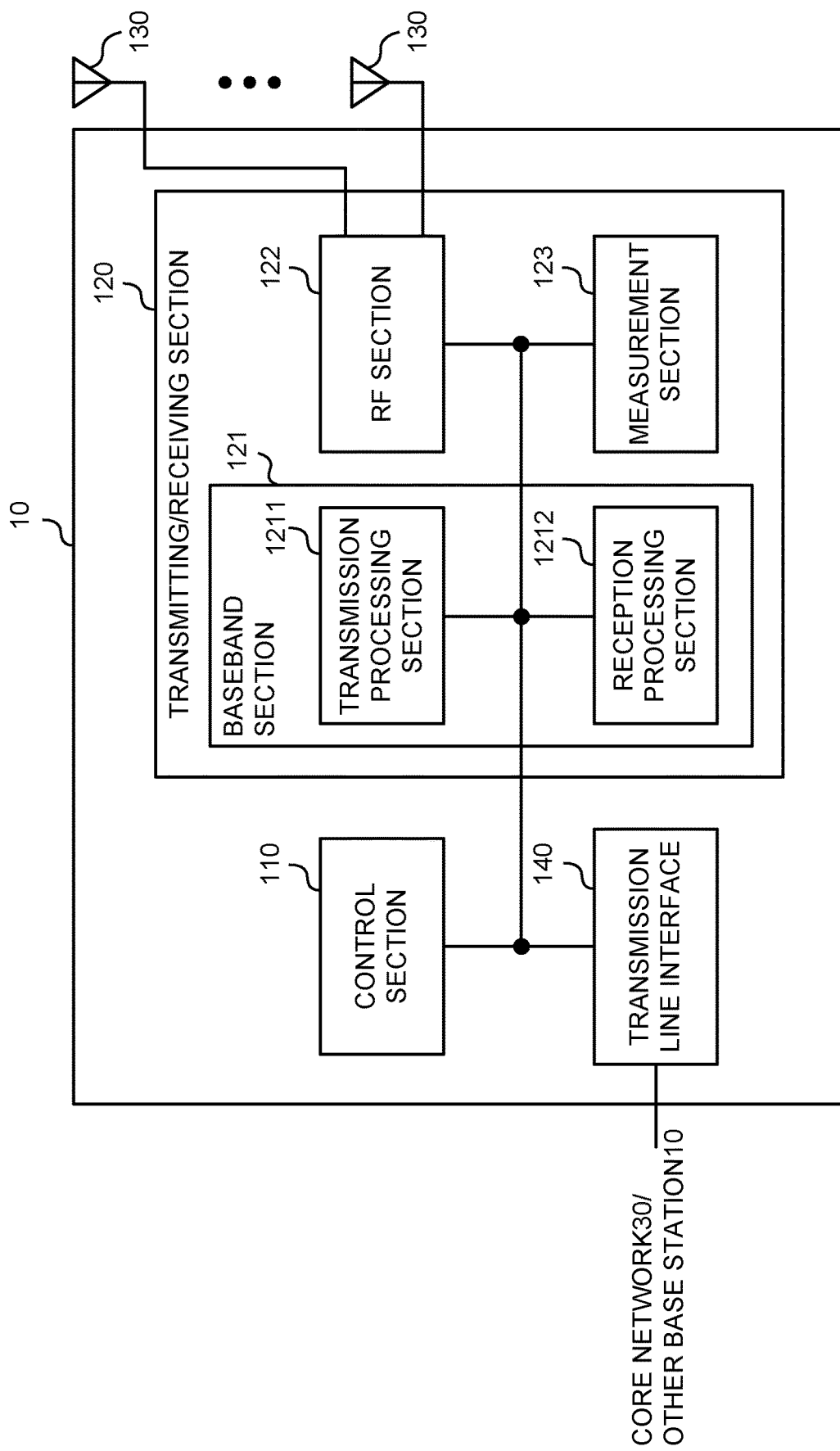
FIG. 11 is a diagram illustrating an example of a configuration of a base station according to one embodiment.

FIG. 11 is a diagram illustrating an example of a configuration of a base station according to one embodiment. The base station 10 includes a control unit 110, a transmission/reception unit 120, a transmission/reception antenna 130, and a transmission line interface 140. Note that one or more of the control units 110, one or more of the transmission/reception units 120, one or more of the transmission/reception antennas 130, and one or more of the transmission line interfaces 140 may be provided.

Note that, although this example will primarily illustrate functional blocks that pertain to characteristic parts of the present embodiment, it may be assumed that the base station 10 has other functional blocks that are necessary for radio communication as well. A part of processing of each unit described below may be omitted.

The control unit 110 controls the entire base station 10. The control unit 110 can be constituted by a controller, a control circuit, or the like, which is described based on common recognition in the technical field to which the present disclosure relates.

The control unit 110 may control signal generation, scheduling (for example, resource allocation or mapping), and the like. The control unit 110 may control transmission/reception, measurement, and the like using the transmission/reception unit 120, the transmission/reception antenna 130, and the transmission line interface 140. The control unit 110 may generate data to be forwarded as a signal, control information, a sequence, and the like, and may transfer the data, the control information, the sequence, and the like to the transmission/reception unit 120. The control unit 110 may perform call processing (such as configuration or release) of a communication channel, management of the state of the base station 10, and management of a radio resource.

The transmission/reception unit 120 may include a base band unit 121, a radio frequency (RF) unit 122, and a measurement unit 123. The base band unit 121 may include a transmission processing unit 1211 and a reception processing unit 1212. The transmission/reception unit 120 can be implemented by a transmitter/receiver, an RF circuit, a base band circuit, a filter, a phase shifter, a measurement circuit, a transmission/reception circuit, and the like, which are described based on common recognition in the technical field related to the present disclosure.

The transmission/reception unit 120 may be constituted as an integrated transmission/reception unit, or may be constituted by a transmitting unit and a reception unit. The transmitting unit may be configured by the transmission processing unit 1211 and the RF unit 122. The reception unit may be constituted by the reception processing unit 1212, the RF unit 122, and the measurement unit 123.

The transmission/reception antenna 130 can be implemented by an antenna described based on common recognition in the technical field related to the present disclosure, for example, an array antenna.

The transmission/reception unit 120 may transmit the above-described downlink channel, synchronization signal, downlink reference signal, and the like. The transmission/reception unit 120 may receive the above-described uplink channel, uplink reference signal, and the like.

The transmission/reception unit 120 may form at least one of a transmission beam and a reception beam by using digital beam forming (for example, precoding), analog beam forming (for example, phase rotation), and the like.

The transmission/reception unit 120 (transmission processing unit 1211) may perform packet data convergence protocol (PDCP) layer processing, radio link control (RLC) layer processing (for example, RLC retransmission control), medium access control (MAC) layer processing (for example, HARQ retransmission control), and the like, for example, on data or control information acquired from the control unit 110 to generate a bit string to be transmitted.

The transmission/reception unit 120 (transmission processing unit 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog transform on the bit string to be transmitted, and may output a base band signal.

The transmission/reception unit 120 (RF unit 122) may perform modulation to a radio frequency range, filtering processing, amplification, and the like on the base band signal, to transmit a signal in the radio frequency range via the transmission/reception antenna 130.

Meanwhile, the transmission/reception unit 120 (RF unit 122) may perform amplification, filtering processing, demodulation to a base band signal, and the like on the signal in the radio frequency band received by the transmission/reception antenna 130.

The transmission/reception unit 120 (reception processing unit 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, and PDCP layer processing on the acquired base band signal to acquire user data and the like.

The transmission/reception unit 120 (measurement unit 123) may perform measurement on the received signal. For example, the measurement unit 123 may perform radio resource management (RRM) measurement, channel state information (CSI) measurement, and the like based on the received signal. The measurement unit 123 may measure received power (for example, reference signal received power (RSRP)), received quality (for example, reference signal received quality (RSRQ), a signal to interference plus noise ratio (SINR), or a signal to noise ratio (SNR)), signal strength (for example, received signal strength indicator (RSSI)), propagation path information (for example, CSI), and the like. The measurement result may be output to the control unit 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that the transmitting unit and the reception unit of the base station 10 in the present disclosure may include at least one of the transmission/reception unit 120, the transmission/reception antenna 130, and the transmission line interface 140.

Note that the transmission/reception unit 120 may transmit a reference signal (for example, SSB, CSI-RS, or the like). The transmission/reception unit 120 may transmit information (MAC CE or DCI) indicating the TCI state for the specific DL transmission. The TCI state may indicate at least one of a reference signal (for example, SSB, CSI-RS, or the like), a QCL type, and a cell that transmits the reference signal. The TCI state may indicate one or more reference signals. The one or more reference signals may include a reference signal of QCL type A or a reference signal of QCL type D.

The control unit 110 may assume that a first reference signal of the spatial relation of the specific uplink transmission (for example, SRS, PUCCH, PUSCH, or the like) is a second reference signal (for example, SSB, CSI-RS) of QCL type D in the transmission control indication (TCI) state or the quasi-co-location (QCL) assumption of the specific downlink channel (for example, PDCCH, PDSCH, or the like).

(User Terminal)

Figure 12:
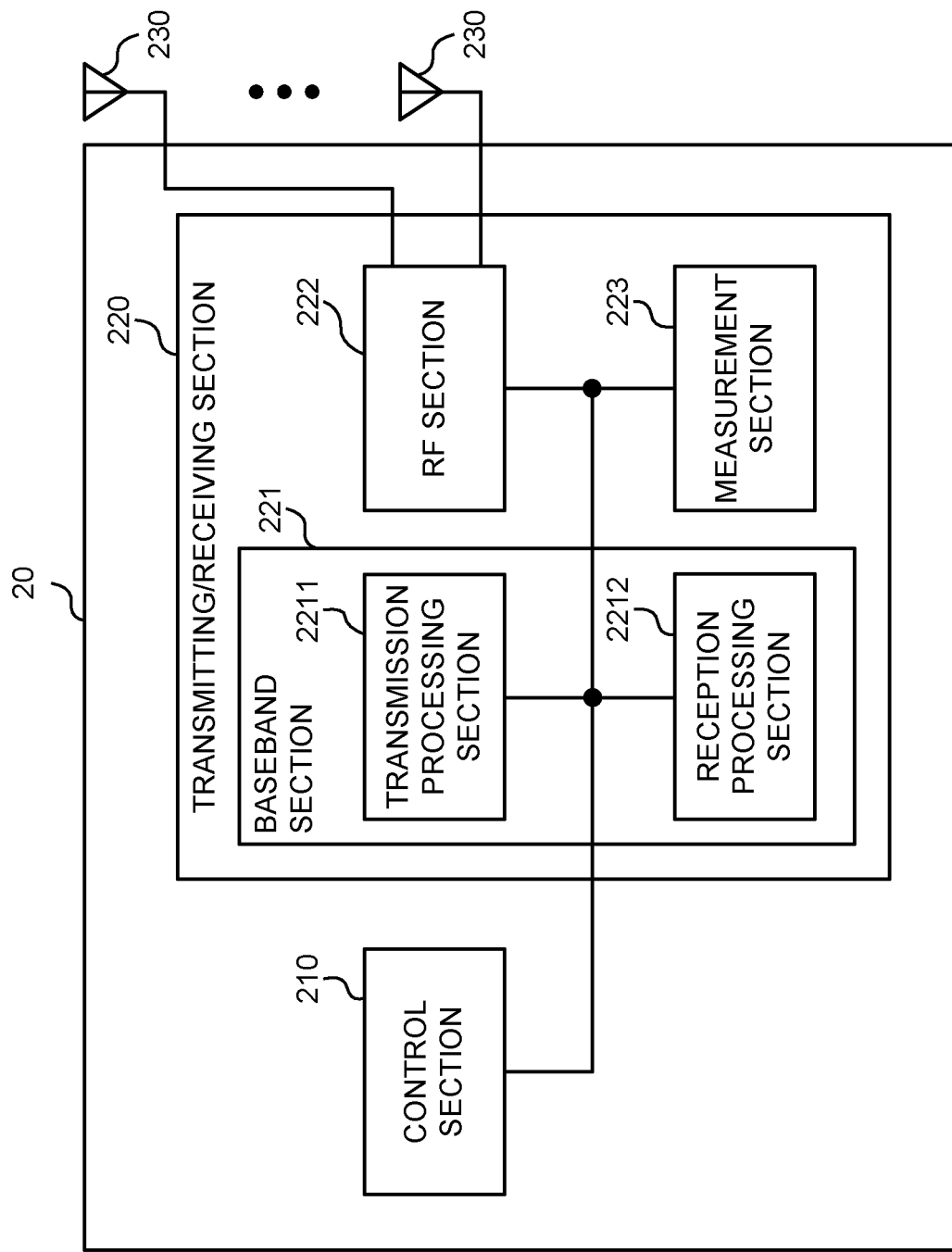
FIG. 12 is a diagram illustrating an example of a configuration of a user terminal according to one embodiment.

FIG. 12 is a diagram illustrating an example of a configuration of a user terminal according to one embodiment. The user terminal 20 includes a control unit 210, a transmission/reception unit 220, and a transmission/reception antenna 230. Note that one or more of the control units 210, one or more of the transmission/reception units 220, and one or more of the transmission/reception antennas 230 may be included.

Note that, although this example mainly describes functional blocks of a characteristic part of the present embodiment, it may be assumed that the user terminal 20 includes other functional blocks that are necessary for radio communication as well. A part of processing of each unit described below may be omitted.

The control unit 210 controls the entire user terminal 20. The control unit 210 can be constituted by a controller, and a control circuit, which are described based on common recognition in the technical field according to the present disclosure.

The control unit 210 may control signal generation, mapping, and the like. The control unit 210 may control transmission/reception, measurement, and the like using the transmission/reception unit 220 and the transmission/reception antenna 230. The control unit 210 may generate data to be transmitted as a signal, control information, a sequence, and the like, and may transfer the data, the control information, the sequence, and the like to the transmission/reception unit 220.

The transmission/reception unit 220 may include a base band unit 221, an RF unit 222, and a measurement unit 223. The base band unit 221 may include a transmission processing unit 2211 and a reception processing unit 2212. The transmission/reception unit 220 can include a transmitter/receiver, an RF circuit, a base band circuit, a filter, a phase shifter, a measurement circuit, a transmission/reception circuit, and the like that are described based on common recognition in the technical field related to the present disclosure.

The transmission/reception unit 220 may be configured as an integrated transmission/reception unit, or may be configured by a transmitting unit and a reception unit. The transmitting unit may be configured by the transmission processing unit 2211 and the RF unit 222. The reception unit may be constituted by the reception processing unit 2212, the RF unit 222, and the measurement unit 223.

The transmission/reception antenna 230 can be constituted by an antenna described based on common recognition in the technical field to which the present disclosure relates, for example, an array antenna.

The transmission/reception unit 220 may receive the above-described downlink channel, synchronization signal, downlink reference signal, and the like. The transmission/reception unit 220 may transmit the above-described uplink channel, uplink reference signal, and the like.

The transmission/reception unit 220 may form at least one of a transmission beam and a reception beam by using digital beam forming (for example, precoding), analog beam forming (for example, phase rotation), and the like.

The transmission/reception unit 220 (transmission processing unit 2211) may perform PDCP layer processing, RLC layer processing (for example, RLC retransmission control), MAC layer processing (for example, HARQ retransmission control), and the like, for example, on data acquired from the control unit 210 or control information to generate a bit string to be transmitted.

The transmission/reception unit 220 (transmission processing unit 2211) may perform transmission processing such as channel encoding (which may include error correction encoding), modulation, mapping, filtering processing, DFT processing (if necessary), IFFT processing, precoding, or digital-analog transform on a bit string to be transmitted, and may output a base band signal.

Note that whether or not to apply DFT processing may be determined based on configuration of transform precoding. When transform precoding is enabled for a channel (for example, PUSCH), the transmission/reception unit 220 (transmission processing unit 2211) may perform DFT processing as the above-described transmission processing in order to transmit the channel by using a DFT-s-OFDM waveform, and if not, the DFT processing does not have to be performed as the transmission processing.

The transmission/reception unit 220 (RF unit 222) may perform modulation to a radio frequency band, filtering processing, amplification, and the like on the base band signal, and may transmit a signal in the radio frequency band via the transmission/reception antenna 230.

Meanwhile, the transmission/reception unit 220 (RF unit 222) may perform amplification, filtering processing, demodulation to a base band signal, and the like on the signal in the radio frequency band received by the transmission/reception antenna 230.

The transmission/reception unit 220 (reception processing unit 2212) may acquire user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired base band signal.

The transmission/reception unit 220 (measurement unit 223) may perform measurement on the received signal. For example, the measurement unit 223 may perform RRM measurement, CSI measurement, and the like based on the received signal. The measurement unit 223 may measure received power (for example, RSRP), received quality (for example, RSRQ, SINR, or SNR), signal strength (for example, RSSI), propagation path information (for example, CSI), and the like. A measurement result may be output to the control unit 210.

Note that the transmitting unit and the reception unit of the user terminal 20 in the present disclosure may include at least one of the transmission/reception unit 220 and the transmission/reception antenna 230.

Note that the transmission/reception unit 220 may receive a reference signal (for example, SSB, CSI-RS, or the like).

The control unit 210 may determine, based on at least one of comparison of a time offset with a threshold between a timing related to a spatial relation of uplink transmission and the uplink transmission, and that usage of the sounding reference signal (SRS) resource set for the uplink transmission is a specific usage, one of a transmission control indication (TCI) state or a quasi-co-location (QCL) assumption (for example, a default spatial relation) for downlink transmission and indicated spatial relation information (for example, spatial relation information based on at least one of RRC signaling, a MAC CE, and DCI) as the spatial relation. The transmission/reception unit 220 may perform the specific uplink transmission using the spatial relation.

The timing may be one of reception (for example, time offset 1) of downlink control information (DCI) related to the uplink transmission, reception (for example, time offset 2) of a media access control (MAC) control element (CE) for activation of the spatial relation, and update (for example, time offset 3) of the TCI state or the QCL assumption.

The threshold may be one of a value configured for the user terminal by higher layer signaling, a value reported by the user terminal as capability information, a threshold of time used to determine a TCI state of a downlink shared channel or an aperiodic channel state information reference signal (A-CSI-RS), a value specified by the specifications, and a value different according to a subcarrier spacing (Embodiment 2).

In a case where the time offset is less than the threshold, the control unit 210 may determine the TCI state or the QCL assumption as the spatial relation. When the time offset is equal to or greater than the threshold, the control unit 210 may determine the indicated spatial relation information as the spatial relation (Embodiment 3).

When usage of the SRS resource set is beam management, the control unit 210 may determine the TCI state or the QCL assumption as the spatial relation based on at least one of whether or not the time offset is less than the threshold or whether or not the time offset is a specific location within a period of the uplink transmission (Embodiment 4).

(Hardware Configuration)

Note that the block diagrams that have been used to describe the above embodiments illustrate blocks in functional units. These functional blocks (configuration units) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (using wire, radio, or the like, for example) and using these plural apparatuses. The functional blocks may be implemented by combining software with the above-described single apparatus or the above-described plurality of apparatuses.

Here, the function includes, but is not limited to, deciding, determining, judging, calculating, computing, processing, deriving, investigating, searching, ascertaining, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like. For example, a functional block (configuration unit) that causes transmission to function may be referred to as a transmitting unit, a transmitter, and the like. In any case, as described above, the implementation method is not particularly limited.

Figure 13:
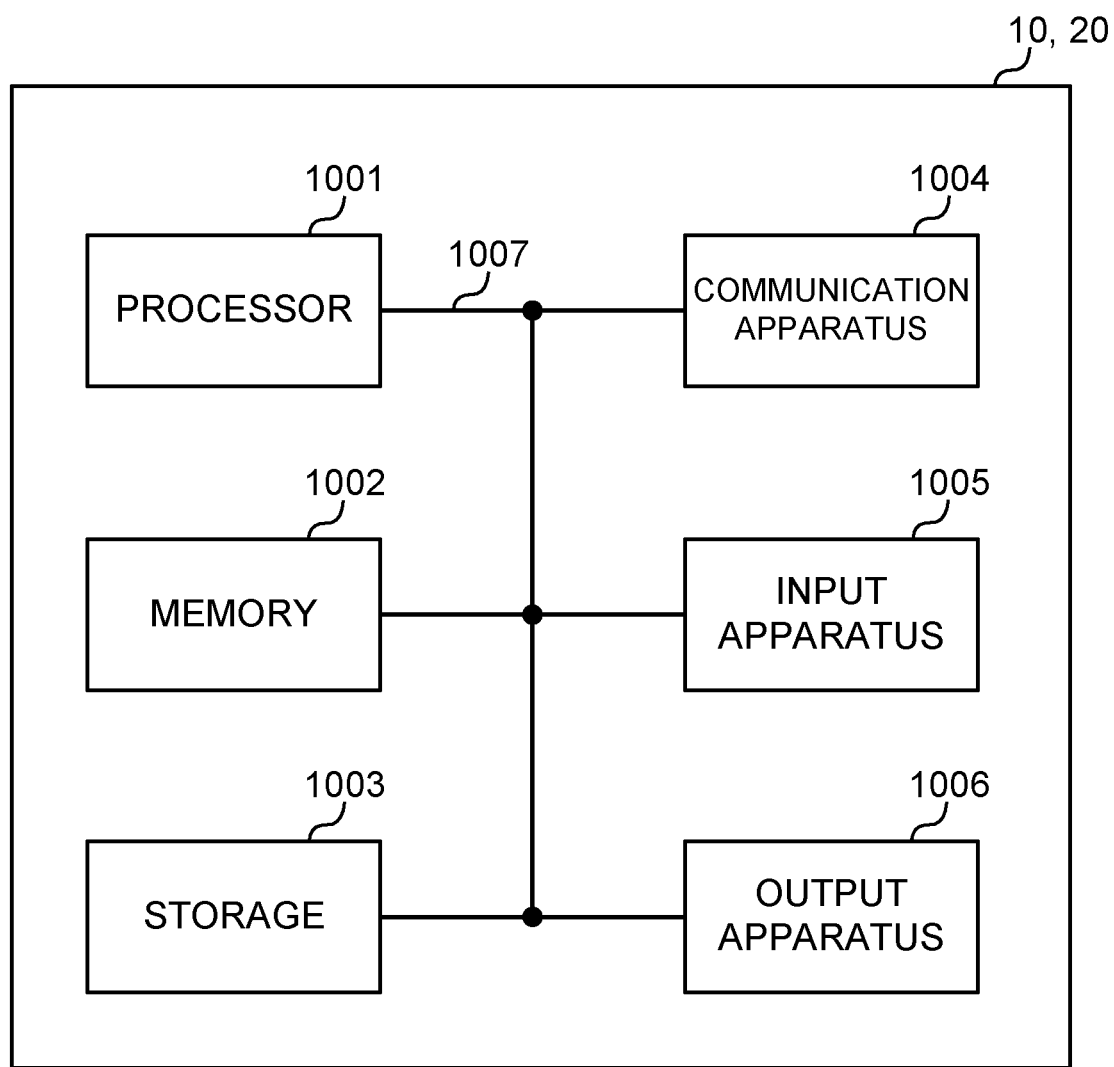
FIG. 13 is a diagram illustrating an example of a hardware configuration of the base station and the user terminal according to one embodiment.

For example, the base station, the user terminal, or the like according to one embodiment of the present disclosure may function as a computer that executes processing a radio communication method in the present disclosure. FIG. 13 is a diagram illustrating an example of a hardware configuration of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, or a unit can be replaced with each other. The hardware configuration of the base station 10 and the user terminal 20 may be configured to include one or a plurality of apparatuses illustrated in the drawings, or may be configured without including some apparatuses.

For example, although only one processor 1001 is illustrated, a plurality of processors may be provided. Further, the processing may be executed by one processor, or the processing may be executed in sequence or using other different methods by two or more processors. Note that the processor 1001 may be implemented with one or more chips.

Each function of the base station 10 and the user terminal 20 is implemented by, for example, controlling communication via the communication apparatus 1004 by causing given software (program) to be read on hardware such as the processor 1001 and the memory 1002 and thereby causing the processor 1001 to perform operation, or by controlling at least one of reading and writing of data in the memory 1002 and the storage 1003.

The processor 1001 may control the whole computer by, for example, running an operating system. The processor 1001 may be configured by a central processing unit (CPU) including an interface with peripheral equipment, a control device, an operation device, a register, and the like. For example, at least a part of the above-described control unit 110 (210), transmission/reception unit 120 (220), and the like may be implemented by the processor 1001.

Furthermore, the processor 1001 reads programs (program codes), software modules, data, and so on from at least one of the storage 1003 or the communication apparatus 1004 into the memory 1002, and executes various processing according to these. As the program, a program to cause a computer to execute at least a part of the operation described in the above-described embodiment is used. For example, the control unit 110 (210) may be implemented by control programs that are stored in the memory 1002 and that operate on the processor 1001, and other functional blocks may be implemented likewise.

The memory 1002 is a computer-readable recording medium, and may be implemented by, for example, at least one of a read only memory (ROM), an erasable programmable ROM (EPROM), an electrically EPROM (EEPROM), a random access memory (RAM), and/or other appropriate storage media. The memory 1002 may be referred to as a register, a cache, a main memory (primary storage apparatus), and the like. The memory 1002 can store a program (program code), a software module, and the like, which are executable for implementing the radio communication method according to one embodiment of the present disclosure.

The storage 1003 is a computer-readable recording medium, and may be constituted by, for example, at least one of a flexible disk, a floppy (registered trademark) disk, a magneto-optical disk (for example, a compact disc ROM (CD-ROM) and the like), a digital versatile disc, a Blu-ray (registered trademark) disk), a removable disk, a hard disk drive, a smart card, a flash memory device (for example, a card, a stick, a key drive), a magnetic stripe, a database, a server, and other appropriate storage media. The storage 1003 may be referred to as "secondary storage apparatus".

The communication apparatus 1004 is hardware (transmitting/receiving device) for performing inter-computer communication via at least one of a wired network or a wireless network, and for example, is referred to as "network device", "network controller", "network card", "communication module", and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmission/reception unit 120 (220), the transmission/reception antenna 130 (230), and the like described above may be implemented by the communication apparatus 1004. The transmission/reception unit 120 (220) may be mounted in a physically or logically separated manner with the transmitting unit 120a (220a) and the reception unit 120b (220b).

The input apparatus 1005 is an input device for receiving input from the outside (for example, a keyboard, a mouse, a microphone, a switch, a button, a sensor and so on). The output apparatus 1006 is an output device that performs output to the outside (for example, a display, a speaker, a light emitting diode (LED) lamp, and the like). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Furthermore, the base station 10 and user terminal 20 may include hardware such as a microprocessor, a Digital Signal Processor (DSP), an Application Specific Integrated Circuit (ASIC), a Programmable Logic Device (PLD), or a Field Programmable Gate Array (FPGA), and some or all of the functional blocks may be implemented by using the hardware. For example, the processor 1001 may be implemented with at least one of these pieces of hardware.

(Modifications)

Note that terms described in the present disclosure and terms necessary for understanding the present disclosure may be replaced with terms that have the same or similar meanings. For example, a channel, a symbol, and a signal (signal or signaling) may be replaced interchangeably. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may include one or a plurality of durations (frames) in the time domain. Each of the one or plurality of periods (frames) included in the radio frame may be referred to as a subframe. Further, the subframe may include one or more slots in the time domain. A subframe may be a fixed time duration (for example, 1 ms) that is not dependent on numerology.

Here, the numerology may be a communication parameter used for at least one of transmission or reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, specific windowing processing performed by a transceiver in the time domain, and the like.

The slot may include one or a plurality of symbols (for example, orthogonal frequency division multiplexing (OFDM) symbol and single carrier frequency division multiple access (SC-FDMA) symbol) in the time domain. Also, a slot may be a time unit based on numerology.

A slot may include a plurality of mini slots. Each mini slot may include one or a plurality of symbols in the time domain. Further, the mini slot may be referred to as a sub slot. Each mini slot may include fewer symbols than a slot. PDSCH (or PUSCH) transmitted in a time unit larger than a mini slot may be referred to as PDSCH (PUSCH) mapping type A. A PDSCH (or PUSCH) transmitted using a mini slot may be referred to as "PDSCH (PUSCH) mapping type B".

A radio frame, a subframe, a slot, a mini slot and a symbol all represent the time unit in signal communication. The radio frame, the subframe, the slot, the mini slot, and the symbol may be called by other applicable names, respectively. Note that time units such as a frame, a subframe, a slot, a mini slot, and a symbol in the present disclosure may be replaced with each other.

For example, one subframe may be referred to as a TTI, a plurality of consecutive subframes may be referred to as a TTI, or one slot or one mini slot may be referred to as a TTI. That is, at least one of the subframe and TTI may be a subframe (1 ms) in the existing LTE, may be a period shorter than 1 ms (for example, one to thirteen symbols), or may be a period longer than 1 ms. Note that the unit to represent the TTI may be referred to as a "slot", a "mini slot" and so on, instead of a "subframe".

Here, a TTI refers to the minimum time unit of scheduling in radio communication, for example. For example, in the LTE system, a base station performs scheduling to allocate radio resources (a frequency bandwidth and transmission power that can be used in each user terminal and the like) to each user terminal in TTI units. Note that the definition of TTIs is not limited to this.

The TTI may be the transmission time unit of channel-encoded data packets (transport blocks), code blocks, or codewords, or may be the unit of processing in scheduling, link adaptation, or the like. Note that when TTI is given, a time interval (for example, the number of symbols) in which the transport blocks, the code blocks, the codewords, and the like are actually mapped may be shorter than TTI.

Note that, when one slot or one mini slot is referred to as a "TTI", one or more TTIs (that is, one or more slots or one or more mini slots) may be the minimum time unit of scheduling. Also, the number of slots (the number of mini slots) to constitute this minimum time unit of scheduling may be controlled.

A TTI having a period of 1 ms may be referred to as usual TTI (TTI in 3GPP Rel. 8 to 12), normal TTI, long TTI, a usual subframe, a normal subframe, a long subframe, a slot, or the like. TTI shorter than normal TTI may also be referred to as shortened TTI, short TTI, partial TTI (or fractional TTI), a shortened subframe, a short subframe, a mini slot, a subslot, a slot, or the like.

Note that a long TTI (for example, a normal TTI, a subframe, or the like) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of contiguous subcarriers in the frequency domain. The number of subcarriers included in the RB may be the same regardless of the numerology, and may be twelve, for example. The number of subcarriers included in the RB may be determined based on numerology.

Also, an RB may include one or more symbols in the time domain, and may be one slot, one mini slot, one subframe or one TTI in length. One TTI, one subframe, and the like each may be composed of one or more resource blocks.

Note that one or a plurality of RBs may be referred to as a physical resource block (PRB), a sub-carrier group (SCG), a resource element group (REG), a PRB pair, an RB pair, and the like.

A resource block may include one or a plurality of resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. The PRB may be defined in a certain BWP and be numbered within the BWP.

BWP may include BWP for UL (UL BWP) and BWP for DL (DL BWP). For the UE, one or a plurality of BWPs may be configured within one carrier.

At least one of the configured BWPs may be active, and the UE does not need to assume to transmit or receive a given signal/channel outside the active BWP. Note that "cell", "carrier", and the like in the present disclosure may be replaced with "BWP".

Note that the structures of radio frames, subframes, slots, mini slots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol duration, the length of cyclic prefix (CP), and the like can be variously changed.

Furthermore, information, a parameter, or the like described in the present disclosure may be represented in absolute values, represented in relative values with respect to given values, or represented by using another corresponding information. For example, a radio resource may be indicated by a given index.

The names used for parameters and the like in the present disclosure are in no respect limiting. Further, any mathematical expression or the like that uses these parameters may differ from those explicitly disclosed in the present disclosure. Since various channels (PUCCH, PDCCH, and the like) and information elements can be identified by any suitable names, various names assigned to these various channels and information elements are not restrictive names in any respect.

The information, signals, and the like described in the present disclosure may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Further, information, signals and the like can be output in at least one of a direction from higher layers to lower layers and a direction from lower layers to higher layers. Information, signals and so on may be input and output via a plurality of network nodes.

The information, signals and so on that are input and/or output may be stored in a specific location (for example, in a memory), or may be managed in a management table. The information, signal, and the like to be input and output can be overwritten, updated or appended. The output information, signal, and the like may be deleted. The information, signals and so on that are input may be transmitted to other pieces of apparatus.

Notification of information may be performed not only by using the aspects/embodiments described in the present disclosure but also using another method. For example, notification of information in the present disclosure may be performed by using physical layer signaling (for example, downlink control information (DCI), uplink control information (UCI)), higher layer signaling (for example, radio resource control (RRC) signaling, broadcast information (master information block (MIB), system information block (SIB), or the like), medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of MAC signaling may be performed using, for example, a MAC control element (MAC CE).

Further, notification of given information (for example, notification of "being X") is not limited to explicit notification but may be performed implicitly (for example, by not performing notification of the given information or by performing notification of another piece of information).

Decisions may be made in values represented by one bit (0 or 1), may be made in Boolean values that represent true or false, or may be made by comparing numerical values (for example, comparison against a given value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server, or another remote source by using at least one of a wired technology (coaxial cable, optical fiber cable, twisted pair, digital subscriber line (DSL), or the like) and a wireless technology (infrared rays, microwaves, and the like), at least one of the wired technology and the wireless technology is included within the definition of a transmission medium.

The terms "system" and "network" used in the present disclosure can be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier" can be used interchangeably. A base station may be referred to as a term such as a macro cell, a small cell, a femto cell, a pico cell, and the like.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small remote radio head (RRH) for indoors). The term "cell" or "sector" refers to a part or the whole of a coverage area of at least one of a base station and a base station subsystem that perform a communication service in this coverage.

In the present disclosure, the terms such as mobile station (MS)", "user terminal", "user equipment (UE)", and "terminal" can be used interchangeably.

A mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or by some other appropriate terms.

At least one of the base station and the mobile station may be referred to as a transmitting apparatus, a receiving apparatus, a radio communication apparatus, and the like. Note that at least one of the base station and the mobile station may be a device mounted on a moving body, a moving body itself, and the like. The moving body may be a transportation (for example, a car, an airplane and the like), an unmanned moving body (for example, a drone, an autonomous car, and the like), or a (manned or unmanned) robot. Note that at least one of the base station and the mobile station also includes an apparatus that does not necessarily move during a communication operation. For example, at least one of the base station and the mobile station may be an Internet of Things (IoT) device such as a sensor.

Furthermore, a base station in the present disclosure may be interpreted as a user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In the case, the user terminal 20 may have the function of the above-described base station 10. Further, terms such as "uplink" and "downlink" may be replaced with terms corresponding to communication between terminals (for example, "side"). For example, the uplink channel, the downlink channel, and the like may be replaced with a side channel.

Similarly, the user terminal in the present disclosure may be replaced with a base station. In this case, the base station 10 may be configured to have the above-described functions of the user terminal 20

In the present disclosure, an operation performed by a base station may be performed by an upper node thereof in some cases. In a network including one or a plurality of network nodes including the base station, it is clear that various operations performed to communicate with terminals may be performed by the base station, one or more network nodes other than the base station (for example, mobility management entity (MME), serving-gateway (S-GW), and the like are conceivable, but there is no limitation), or a combination thereof.

The aspects/embodiments illustrated in the present disclosure may be used individually or in combinations, which may be switched depending on the mode of implementation. Further, the order of processing procedures, sequences, flowcharts, and the like of the aspects/embodiments described in the present disclosure may be re-ordered as long as there is no inconsistency. For example, regarding the methods described in the present disclosure, elements of various steps are presented using an illustrative order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on these, and the like. Further, a plurality of systems may be combined and applied (for example, a combination of LTE or LTE-A and 5G, and the like).

The phrase "based on" as used in the present disclosure does not mean "based only on", unless otherwise specified. In other words, the phrase "based on" means both "based only on" and "based at least on".

Any reference to an element using designations such as "first" and "second" used in the present disclosure does not generally limit the amount or order of these elements. These designations can be used in the present disclosure, as a convenient way of distinguishing between two or more elements. In this way, reference to the first and second elements does not imply that only two elements may be employed, or that the first element must precede the second element in some way.

The term "determining" as used in the present disclosure may include a wide variety of operations. For example, "determining (deciding)" may be regarded as "determining (deciding)" of judging, calculating, computing, processing, deriving, investigating, looking up, search, inquiry (for example, looking up in a table, database, or another data structure), ascertaining, and the like.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on.

In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

Furthermore, "determining" may be replaced with "assuming", "expecting", "considering", and the like.

As used in the present disclosure, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced with "access".

As used in the present disclosure, when two elements are connected, these elements may be considered to be "connected" or "coupled" to each other by using one or more electrical wires, cables, printed electrical connections, and the like, and, as some non-limiting and non-inclusive examples, by using electromagnetic energy and the like having wavelengths in the radio frequency, microwave, and optical (both visible and invisible) domains.

In the present disclosure, the phrase "A and B are different" may mean "A and B are different from each other". Note that the description may mean that "A and B are different from C". Terms such as "leave", "coupled", or the like may also be interpreted in the same manner as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, when articles, such as "a", "an", and "the" are added in English translation, the present disclosure may include the plural forms of nouns that follow these articles.

Now, although invention according to the present disclosure has been described above in detail, it is obvious to those skilled in the art that the invention according to the present disclosure is by no means limited to the embodiments described in the present disclosure. The invention according to the present disclosure can be embodied with various corrections and in various modified aspects, without departing from the spirit and scope of the invention defined based on the description of claims. Consequently, the description of the present disclosure is provided only for the purpose of explaining examples, and should by no means be construed to limit the invention according to the present disclosure in any way.

This application is based on Japanese Patent Application No. 2019-094118 filed on May 17, 2019. The contents of this are all incorporated herein.

The invention claimed is:

1. A terminal comprising:
a receiving section that receives a medium access control (MAC) control element (CE) indicating a transmission configuration indication (TCI) state for a control resource set; and
a control section that determines, when a higher layer parameter indicating use of default beam for an uplink transmission is configured and spatial relation information applicable for the uplink transmission is not configured, whether a reference signal corresponding to the TCI state is used for a spatial relation for the uplink transmission or not, based on a time from reception of the MAC CE to the uplink transmission.

2. The terminal according to claim 1, wherein the uplink transmission is a sounding reference signal (SRS), and the SRS uses a resource in an SRS resource set with usage except for beam management.

3. The terminal according to claim 1, wherein the control resource set is configured with a lowest control resource set ID.

4. The terminal according to claim 2, wherein the control resource set is configured with a lowest control resource set ID.

5. A radio communication method for a terminal, comprising:
receiving a medium access control (MAC) control element (CE) indicating a transmission configuration indication (TCI) state for a control resource set; and
determining, when a higher layer parameter indicating use of default beam for an uplink transmission is configured and spatial relation information applicable for the uplink transmission is not configured, whether a reference signal corresponding to the TCI state is used for a spatial relation for the uplink transmission or not, based on a time from reception of the MAC CE to the uplink transmission.

6. A base station comprising:
a transmitting section that transmits a medium access control (MAC) control element (CE) indicating a transmission configuration indication (TCI) state for a control resource set; and
a control section that controls reception of an uplink transmission,
wherein when a higher layer parameter indicating use of default beam for an uplink transmission is configured and spatial relation information applicable for the uplink transmission is not configured, whether a reference signal corresponding to the TCI state is used for a spatial relation for the uplink transmission or not is determined based on a time from reception of the MAC CE to the uplink transmission.

7. A system comprising a terminal and a base station, wherein
the terminal comprises:
a receiving section that receives a medium access control (MAC) control element (CE) indicating a transmission configuration indication (TCI) state for a control resource set; and
a control section that determines, when a higher layer parameter indicating use of default beam for an uplink transmission is configured and spatial relation information applicable for the uplink transmission is not configured, whether a reference signal corresponding to the TCI state is used for a spatial relation for the uplink transmission or not, based on a time from reception of the MAC CE to the uplink transmission, and
the base station transmits the MAC CE.

* * * * *